US011254051B2

(12) United States Patent
Chanclon et al.

(10) Patent No.: US 11,254,051 B2
(45) Date of Patent: Feb. 22, 2022

(54) BUILD MATERIAL CONTAINERS

(71) Applicant: HEWLETT-PACKARD DEVELOPMENT COMPANY, L.P., Spring, TX (US)

(72) Inventors: Ismael Chanclon, Sant Cugat del Valles (ES); Xavier Alonso, Sant Cugat del Valles (ES); Santiago Sarda, Barcelona (ES); Nicola Cofelice, Terrassa (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 178 days.

(21) Appl. No.: 16/068,881

(22) PCT Filed: May 12, 2016

(86) PCT No.: PCT/EP2016/060795
§ 371 (c)(1),
(2) Date: Jul. 9, 2018

(87) PCT Pub. No.: WO2017/194151
PCT Pub. Date: Nov. 16, 2017

(65) Prior Publication Data
US 2019/0054693 A1 Feb. 21, 2019

(51) Int. Cl.
*B65D 77/06* (2006.01)
*B65D 5/60* (2006.01)
(Continued)

(52) U.S. Cl.
CPC ............. *B29C 64/255* (2017.08); *B22F 3/004* (2013.01); *B22F 12/00* (2021.01); *B33Y 30/00* (2014.12);
(Continued)

(58) Field of Classification Search
CPC ........... B22F 2003/1056; B22F 3/1055; B29C 31/02; B29C 64/153; B29C 64/255;
(Continued)

(56) References Cited

U.S. PATENT DOCUMENTS

| 1,623,107 A | * | 4/1927 | Goodykoontz | ........ | A01G 25/14 |
| | | | | | 222/107 |
| 1,891,839 A | * | 12/1932 | Robinson | ............. | B65D 5/5045 |
| | | | | | 206/418 |

(Continued)

FOREIGN PATENT DOCUMENTS

| CN | 1237409 | 1/2006 |
| CN | 101495294 B | 7/2009 |

(Continued)

*Primary Examiner* — Gideon R Weinerth
(74) *Attorney, Agent, or Firm* — HP Inc. Patent Department

(57) ABSTRACT

There is provided a 3D printing build material container (1). The container (1) comprises a reservoir (3) and a reinforcement structure (4). The reservoir is to hold build material. The reinforcement structure is attached to the reservoir at at least one selected location. The reservoir and reinforcement structure are to permit reconfiguration of the container from a relatively flat configuration to an in-use configuration in which the reservoir is tillable with build material.

19 Claims, 11 Drawing Sheets

(51) Int. Cl.

| | |
|---|---|
| *B29C 64/255* | (2017.01) |
| *B33Y 30/00* | (2015.01) |
| *B33Y 40/00* | (2020.01) |
| *B22F 3/00* | (2021.01) |
| *B33Y 99/00* | (2015.01) |
| *B22F 12/00* | (2021.01) |
| *C03B 19/01* | (2006.01) |
| *B22F 1/00* | (2022.01) |
| *B22F 10/10* | (2021.01) |

(52) U.S. Cl.
CPC ............... *B33Y 40/00* (2014.12); *B33Y 99/00* (2014.12); *C03B 19/01* (2013.01); *B22F 1/0059* (2013.01); *B22F 1/0074* (2013.01); *B22F 10/10* (2021.01); *B22F 2001/0092* (2013.01); *Y02P 10/25* (2015.11)

(58) Field of Classification Search
CPC ..... B29C 64/321; B29C 64/20; B29C 64/165; B33Y 10/00; B33Y 30/00; B33Y 40/00; B33Y 70/00; B65D 5/606; B65D 5/029; B65D 5/5045; B65D 75/008; B65D 83/0055; B65D 83/06; B65D 5/4608; B65D 5/46096; B65D 5/46008; B65D 5/727; B65D 77/065; B65D 77/22; B65G 65/36; Y02P 10/295; C08G 63/199; B67D 3/0067
USPC ........ 399/262; 206/220; 222/95, 105, 386.5, 222/511, 185.1; 229/114, 115, 117.32, 229/117.34, 403, 404, 405, 101, 940, 229/117.3, 117.35, 117.27, 117.29, 229/117.33; 220/495.01; 53/442
See application file for complete search history.

(56) References Cited

U.S. PATENT DOCUMENTS

| | | | | | |
|---|---|---|---|---|---|
| 2,171,717 | A | * | 9/1939 | Vogt | B65D 5/70 229/117.3 |
| 2,177,918 | A | * | 10/1939 | Vogt | B65D 5/72 229/117.27 |
| 2,345,646 | A | * | 4/1944 | Williamson | B65D 5/068 229/113 |
| 2,618,409 | A | * | 11/1952 | Eisenberger | B65D 77/065 222/95 |
| 2,894,666 | A | * | 7/1959 | Campbell, Jr. | B65D 5/726 222/528 |
| 3,061,165 | A | * | 10/1962 | Rench | B65D 77/064 206/524.8 |
| 3,132,789 | A | * | 5/1964 | Forrest | B65D 77/065 229/117.3 |
| 3,171,571 | A | * | 3/1965 | Daniels | B67D 1/0462 222/94 |
| 3,275,197 | A | | 9/1966 | Eklund | |
| 3,339,721 | A | * | 9/1967 | Goldstein | B65D 33/02 206/583 |
| 4,120,420 | A | * | 10/1978 | Dirksing | B65D 5/726 222/460 |
| 4,121,389 | A | | 10/1978 | Ptaszek | |
| 4,197,962 | A | * | 4/1980 | Edwards | B65D 5/72 229/117.3 |
| 4,786,192 | A | * | 11/1988 | Graves | B65D 77/06 229/117.3 |
| 5,269,414 | A | | 12/1993 | D'Hollander | |
| 5,402,915 | A | * | 4/1995 | Hogan | B65D 77/0466 222/105 |
| 5,480,057 | A | | 1/1996 | Papaluca | |
| D378,660 | S | * | 4/1997 | Ota | B22F 10/20 D18/56 |
| 6,304,739 | B1 | * | 10/2001 | Katsuyama | G03G 15/0874 222/DIG. 1 |
| 6,467,652 | B2 | * | 10/2002 | Wilcox | B65D 77/06 222/386.5 |
| 6,532,352 | B2 | * | 3/2003 | Katsuyama | B65D 77/06 222/DIG. 1 |
| 6,549,744 | B2 | * | 4/2003 | Terazawa | B65D 77/06 399/262 |
| 6,591,077 | B2 | * | 7/2003 | Yanagisawa | G03G 15/0822 222/DIG. 1 |
| 6,648,218 | B2 | * | 11/2003 | Katsuyama | G03G 15/0865 229/117.35 |
| 6,808,092 | B2 | * | 10/2004 | Timbrook | B65D 5/0227 222/460 |
| 6,874,879 | B2 | * | 4/2005 | Haan | B41J 2/17513 347/86 |
| D519,833 | S | * | 5/2006 | Katsuyama | D9/431 |
| 7,296,599 | B2 | | 11/2007 | Cox | |
| 7,593,674 | B2 | * | 9/2009 | Matsumoto | G03G 15/0874 399/262 |
| 7,607,537 | B2 | * | 10/2009 | Katsuyama | B65D 5/18 206/525 |
| 7,681,783 | B2 | * | 3/2010 | Stephenson | B65D 5/4608 229/117.3 |
| 7,954,670 | B2 | * | 6/2011 | Stuart | B67D 7/3254 222/95 |
| 8,033,447 | B2 | * | 10/2011 | Katoh | G03G 15/0865 229/101 |
| 8,474,655 | B2 | * | 7/2013 | Hackleman | B65D 5/0236 222/105 |
| 8,511,538 | B2 | * | 8/2013 | Ouillette | B65D 5/4608 229/117.3 |
| 8,556,107 | B2 | * | 10/2013 | McRobbie | B65D 77/06 220/495.06 |
| 9,016,555 | B2 | * | 4/2015 | Plunkett | B65D 77/065 229/117.3 |
| 10,632,675 | B2 | * | 4/2020 | Chanclon | B29C 64/255 |
| 10,669,071 | B2 | * | 6/2020 | Giulietti | B65D 43/12 |
| 11,097,480 | B2 | * | 8/2021 | Roman | B29C 67/00 |
| 11,104,073 | B2 | * | 8/2021 | Alonso | B22F 10/70 |
| 11,111,066 | B2 | * | 9/2021 | Futase | B65D 5/068 |
| 2001/0017998 | A1 | * | 8/2001 | Terazawa | G03G 15/0865 399/262 |
| 2006/0175385 | A1 | * | 8/2006 | McDowell | B65D 77/065 229/117.32 |
| 2007/0026102 | A1 | | 2/2007 | Devos et al. | |
| 2008/0006334 | A1 | * | 1/2008 | Davidson | B33Y 30/00 137/571 |
| 2008/0245848 | A1 | | 10/2008 | Plunkett et al. | |
| 2008/0265009 | A1 | * | 10/2008 | Katoh | G03G 15/0874 229/117.16 |
| 2008/0267538 | A1 | * | 10/2008 | Stephenson | B65D 77/065 383/33 |
| 2011/0215136 | A1 | * | 9/2011 | Ouillette | B65D 5/5054 229/117.3 |
| 2012/0312813 | A1 | * | 12/2012 | Voelker | B65D 5/4204 220/23.89 |
| 2013/0233912 | A1 | * | 9/2013 | Piotrowski | B65D 71/0085 229/117.3 |
| 2014/0008361 | A1 | | 1/2014 | Nguyen | |
| 2015/0096269 | A1 | * | 4/2015 | Tenegal | B65D 85/70 53/473 |
| 2015/0114996 | A1 | * | 4/2015 | Gallagher | B65D 90/14 222/152 |
| 2015/0217514 | A1 | | 8/2015 | Maier | |
| 2015/0274414 | A1 | * | 10/2015 | Kassouni | B65D 5/724 220/1.5 |
| 2015/0298397 | A1 | * | 10/2015 | Chen | B29C 64/357 209/12.2 |
| 2017/0008697 | A1 | * | 1/2017 | Gillard | B65D 77/067 |
| 2018/0169945 | A1 | * | 6/2018 | Chanclon Fernandez | B01D 46/10 |
| 2019/0030809 | A1 | * | 1/2019 | Gasso | B65D 7/06 |
| 2019/0054693 | A1 | * | 2/2019 | Chanclon | B33Y 30/00 |
| 2019/0054694 | A1 | * | 2/2019 | Chanclon | B29C 64/255 |

(56) References Cited

U.S. PATENT DOCUMENTS

| | | | |
|---|---|---|---|
| 2019/0105835 A1* | 4/2019 | Chanclon Fernandez ................... B29C 64/255 |
| 2019/0118470 A1* | 4/2019 | Alonso ................. | B29C 64/255 |
| 2019/0118475 A1* | 4/2019 | Chanclon ................ | B22F 10/20 |
| 2019/0134908 A1* | 5/2019 | Chanclon ................ | B29C 64/35 |
| 2020/0017269 A1* | 1/2020 | Duckwall, Jr. ......... | B32B 27/08 |
| 2020/0102114 A1* | 4/2020 | Okude ................... | B65D 5/064 |
| 2020/0215753 A1* | 7/2020 | Chanclon ............. | B29C 64/255 |

FOREIGN PATENT DOCUMENTS

| | | |
|---|---|---|
| DE | 4115126 | 6/1996 |
| GB | 2228725 | 9/1990 |
| JP | H06211273 | 8/1994 |
| JP | H07010169 | 1/1995 |
| JP | H09202357 | 8/1997 |
| JP | 2001301847 | 10/2001 |
| JP | 2006312309 | 11/2006 |
| JP | 2010516585 | 5/2010 |
| WO | WO-82/00280 | 2/1982 |
| WO | WO-2013175220 A1 | 11/2013 |
| WO | WO-2015069857 | 5/2015 |

\* cited by examiner

BUILD MATERIAL CONTAINERS

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3D object is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder material, paste material, slurry material or liquid material. The build material is usually provided in a source container from where it is to be transferred to the building area or building compartment of the additive manufacturing apparatus where the actual manufacturing takes place.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
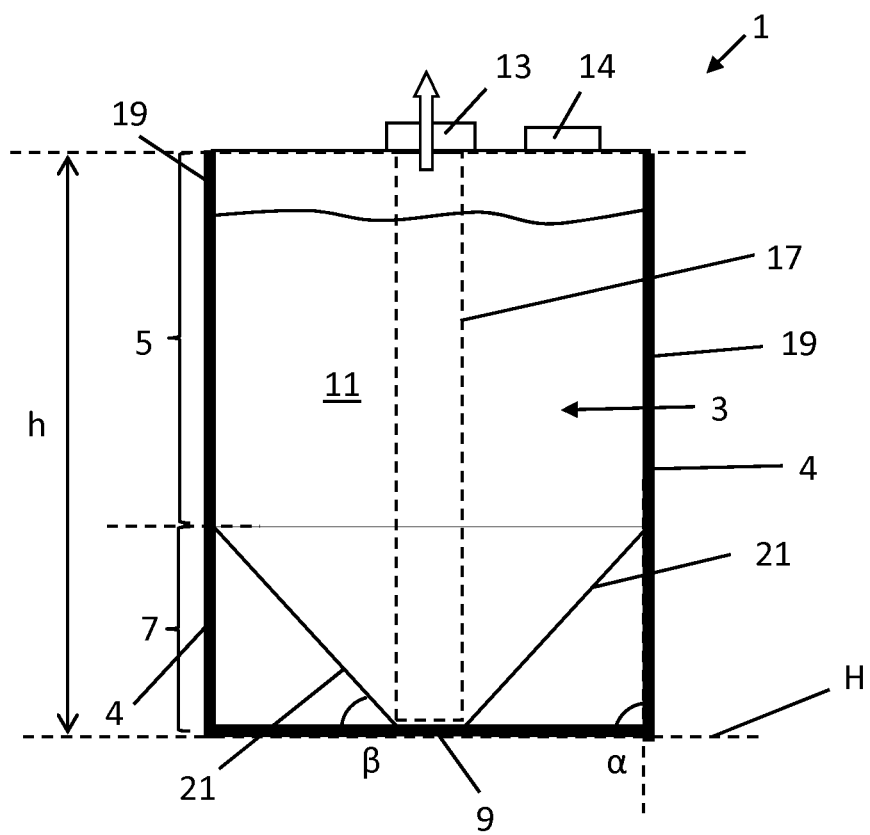
FIG. 1 is a schematic side view of an example of a build material container.

Three-dimensional objects can be generated using additive manufacturing techniques. The objects may be generated by solidifying portions of successive layers of build material. The build material can be powder-based and the properties of generated objects may be dependent upon the type of build material and the type of solidification. In some examples, solidification of the powder material is enabled using a liquid fusing agent. In further examples, solidification may be enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material. This disclosure describes examples of source containers for containing and delivering build material to the additive manufacturing process.

In one example the build material in the container of this disclosure is powder that has an average volume-based cross sectional particle diameter size of between approximately 5 and approximately 400 microns, between approximately 10 and approximately 200 microns, between approximately 15 and approximately 120 microns or between approximately 20 and approximately 70 microns. Other examples of suitable, average volume-based particle diameter ranges include approximately 5 to approximately 70 microns, or approximately 5 to approximately 35 microns. In this disclosure a volume-based particle size is the size of a sphere that has the same volume as the powder particle. With "average" it is intended to explain that most of the volume-based particle sizes in the container are of the mentioned size or size range but that the container may also contain particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing system may be pre-set to distribute build material layers of approximately 80 microns using build material containers that contain powder having average volume-based particle diameters of between approximately 40 and approximately 70 microns. For example, the additive manufacturing apparatus can be reset to distribute different layer thicknesses.

Suitable powder-based build materials for use in example containers of this disclosure include at least one of polymers, crystalline plastics, semi-crystalline plastics, polyethylene (PE), polylactic acid (PLA), acrylonitrile butadiene styrene (ABS), amorphous plastics, polyvinyl alcohol plastic (PVA), polyamide, thermo(setting) plastics, resins, transparent powders, colored powders, metal powder, ceramics powder such as for example, glass particles, and/or a combination of at least two of these or other materials, wherein such combination may include different particles each of different materials, or different materials in a single compound particle. Examples of blended build materials include alumide, which may include a blend of aluminum and polyamide, multi-color powder, and plastics/ceramics blends. Blended build material may comprise two or more different respective average particle sizes.

A particular batch of build material used in an additive manufacturing process may be "virgin" build material or "used" build material. Virgin build material should be considered to be build material which has not been used in any part of an additive manufacturing process, and/or which has not passed through any part of a 3D printing system previously. An unopened supply of build material as supplied by a build material manufacturer therefore contains virgin build material. By contrast, used build material has already been supplied to a 3D printing system for use in an additive manufacturing process. Not all of the build material supplied to a 3D printing system for use in an additive manufacturing process may be used and/or incorporated into a 3D printed article. At least some of the unused build material supplied to a 3D printing system for use in an additive manufacturing process may be suitable for reuse in a subsequent additive manufacturing process. Such build material comprises used build material.

Some example containers of this disclosure may be suitable for containing relatively high volumes of build material, as compared to other examples of containers described herein. Some example containers may comprise features to ensure that the containers can be easily stacked, stored, transported, disposed or refilled. In a filled condition, such example containers should contain a relatively large volume of build material. Some example containers of this disclosure may be configured to facilitate transport of the containers in an unfilled state. Some example containers may be suitable for use to receive and store used build material, which has already been supplied to a 3D printing system for use in an additive manufacturing process and returned, additionally or alternatively to being suitable for use to supply virgin build material to a 3D printing system. Some example containers of this disclosure may facilitate efficient removal, for example, by a build material supply system of a 3D printing system, of build material contained within those containers. Some such example containers may, for example, comprise features to ensure that most or all of the build material can be removed from a container. Such example containers may comprise features to reduce an amount of build material which cannot be removed from a container by a build material supply system, for example, because it is adhered to an interior surface of the container or is otherwise inaccessible to the build material supply system.

The example containers described below with reference to FIGS. 1 to 5B comprise one or more features to facilitate efficient removal of build material from those containers.

FIG. 1 illustrates a diagrammatic front view of an example of a container 1 for supplying build material 11 to an additive manufacturing process. The container 1 is illustrated in an upright orientation, which corresponds to an intended in-use orientation of the container. The container 1 may be a replaceable source container 1 that is to be connected to an additive manufacturing system in an at least partially filled condition so that the additive manufacturing system can collect build material from the container 1, and is to be removed after exhaustion so as to be replaceable by a second, similar container filled with build material. The container may therefore be considered to be a 3D printing build material container. In one example the build material is powder, for example, of a type and/or particle size as described above.

The container 1 comprises a collapsible reservoir 3 to hold build material 11. The container 1 further comprises a relatively rigid reinforcement structure to resist collapsing of at least one reinforced portion of the reservoir. The container 1 further comprises a build material outlet structure 13 to allow build material 11 to exit the reservoir 3; and a gas inlet structure 14 to allow a gas (for example air) to enter the reservoir 3.

The reservoir 3 may comprise a bag, for example, formed from one or several portions of a plastics material. The reservoir 3 may comprise one or several walls. The build material 11 may be contained by walls of the reservoir 3. The reservoir 3 is collapsible relative to the reinforcement structure 4. The reservoir 3 is intended to at least partially collapse during use of the container 1. In the context of the present disclosure, collapse of a structure may be considered to involve a reduction in a volume enclosed or taken up by that structure. The reservoir 3 may be at least partly formed from a flexible material. In some examples the reservoir 3 is relatively flexible. In one example relatively flexible (in relation to a material) can be understood as allowing bending and/or flexing of the material. A flexible material or compound can be elastic (for example, PE) or non-elastic (for example, Mylar). In one example, a flexible and elastic material has a Young's modulus of less than approximately $1*10^9$ N/m$^2$ GPa, or less than approximately $0.3*10^9$ N/m$^2$ GPa. In one example a relatively rigid or non-elastic wall material has a Young's modulus of more than approximately $1*10^9$ N/m$^2$ GPa.

A material from which the reservoir 3 is formed may have a preselected elasticity, for example, selected according to a particular manner in which it is intended to use the container 1. In examples in which it is intended to remove build material 11 from the container 2 using an aspiration system, the reservoir material may have a low elasticity (for example, sufficiently low that little or no stretching of the reservoir material occurs during operation of the aspiration system) and a high tensile strength (for example, 25 Mpa). A material from which the reservoir 3 is formed may be airtight (that is, gas impermeable such that air or any other gas which may be used by the aspiration system to remove build material from the container cannot pass through the walls of the reservoir 3). In some examples the reservoir 3 is formed, at least partly, from a plastics material such as PE, thin-walled PET, Mylar, and the like. In some examples the reservoir is formed from a laminate of one or several materials (for example, PET and LDPE). In some examples the reservoir material is selected such that it is resilient (for example, sufficiently resilient not to break if dropped in a filled state), does not absorb moisture from the environment, and is sufficiently stiff that it does not deform by more than a selected amount, for example, when a suction force is applied to remove build material from the reservoir 3). The reservoir 3 may be formed of a low-cost, disposable, and/or recyclable material.

The material properties of the reservoir 3 (for example, flexibility, elasticity, and the like) may be selected such that the reservoir adopts a partially collapsed form when a system for removing build material from the container 1 (for example, an aspiration system) is operating. For example, the reservoir material of a given reservoir may be flexible enough to be collapsible by a suction force applied by a build material removal system intended to be used to remove build material 11 from that reservoir. The material properties of the reservoir 3 may be selected such that the reservoir adopts the partially collapsed form, during removal of build material from the container, when a threshold amount of build material 11 remains in the reservoir 3. The reservoir may be configured (for example, as a result of its material properties, shape, configuration, and the like) to adopt the partially collapsed form, during removal of build material from the container 1, when a threshold pressure differential between the inside and the outside of the reservoir 3 is reached. In some examples the material properties of the reservoir 3 are selected such that the reservoir 3 transitions gradually between a non-collapsed form and the partially collapsed form during removal of build material 11 from the container 1. In some examples the material properties of the reservoir 3 are selected such that the reservoir 3 transitions rapidly or instantaneously between a non-collapsed form and the partially collapsed form during removal of build material 11 from the container 1. Such a rapid or instantaneous transition to the partially collapsed form may facilitate dislodging of any build material 11 which is loosely adhered to an inside surface of a reservoir wall, and or the break-up of any structures which have formed in the build material 11.

The reservoir 3 may have a preselected shape, for example, selected according to a particular intended use of the container 1. For example, if a particular intended use places size and/or configuration constraints on the container 1, the shape of the reservoir 3 may be selected to maximize the internal volume of the reservoir 3 within those constraints. The shape of the reservoir 3 may be selected to facilitate removal of build material 11 from the reservoir 3 using a particular removal system. The shape of the reservoir 3 may be selected to facilitate folding of the reservoir, for example, so that the reservoir can be transported in a substantially flat folded state, prior to being incorporated into the container 1. The reservoir 3 may comprise sections which differ from one another in their general shape (at least in a filled and not collapsed state of the reservoir 3), for example, a converging section and a non-converging section. A converging section may comprise side walls which converge towards a base of the container. The reservoir 3 shown in FIG. 1, for example, comprises a non-converging upper section 5 and a converging lower section 7. The reservoir may comprise a section having a funneled shape. A non-converging section may comprise at least one side wall which extends substantially vertically (with respect to the in-use orientation), at least in the filled and non-collapsed state of the reservoir. The at least one substantially vertical side wall may be at least one rounded wall, or may form a rectangle with straight or rounded corners, as seen from a top view (not shown). The particular illustrated example reservoir 3 shown in FIG. 1 has an upper section 5 formed by four substantially vertical side walls 19, and a lower section 7 formed by four converging side walls 21. The upper section 5 is cuboidal and the lower section 7 is pyramidal. The side walls 19, 21 each comprise a portion of plastics material, and are sealingly bonded at their edges to form an airtight bag structure.

Side walls (for example, the side walls 19) of non-converging reservoir sections, which are intended to be substantially vertical in an in-use orientation of the container 1 may not be perfectly vertical, for example, because of manufacturing tolerances, mold release angles, thermal curing of the reservoir, or other reasons. For example, the at least one substantially vertical side wall 19 may be slightly inclined for example, under an angle α of between approximately 85 and 95 degrees from a horizontal H, or may have a slightly bulging (outwards or inwards) shape. The angle α between the horizontal H and the relatively upright side walls 19 is larger than an angle β between the side walls 21 of the lower section 7 and the horizontal H. Also, since reservoirs according to the examples are collapsible, a substantially vertical side wall of a reservoir may not be straight or vertical, depending on the condition of the container 1. For example, the example reservoir 3 is to be folded when in an empty condition, and the side walls 19, 21 are to bend during removal of build material from the container 3.

Moreover, reservoir walls may include wrinkles, curvatures, ridges, undulations, and the like. In some examples at least one side wall of the reservoir 3 may be larger in at least one dimension than a corresponding side wall of the reinforcement structure 4. In examples in which the elasticity of the reservoir material is low, such a feature can enable the at least one side wall of the reservoir 3 to move relative to the reinforcement structure 4. It will be appreciated that, in such examples, in a filled state of the container 1, the larger size of the at least one side wall may be accommodated by, for example, the formation of wrinkles, ridges, or other non-flat features in the at least one side wall of the reservoir 3.

The at least one reinforced portion of the reservoir may comprise at least one wall portion of the reservoir. One or several attributes (for example, size, shape, location) of the at least one reinforced portion may be preselected. The at least one reinforced portion may be such that when a pressure within the reservoir 3 is sufficiently lower than a pressure outside of the reservoir 3 to collapse the reservoir 3 the reservoir adopts a partially collapsed form. In some examples the partially collapsed form is predetermined. For example, one or several attributes (for example, size, configuration, volume) of the partially collapsed form is or are predetermined. In some examples a predetermined partially collapsed form is to guide build material contained in the reservoir to a selected location within the reservoir. The location may be selected, for example, based on the configuration of a build material removal system that will be used to remove build material from the container 1. In some examples a lowest point of a predetermined partially collapsed form, when the container is in an intended in-use orientation, generally corresponds to a location at which build material is to be removed from the reservoir during use of the container to supply build material to a 3D printing system. A predetermined partially collapsed form may be created by selecting one or more attributes of the at least one reinforced portion, by selecting a shape and/or configuration of the reservoir 3, by selecting a shape and/or configuration of the reinforcement structure 4, and/or by selecting one or several material properties of the reservoir 3.

The reinforcement structure 4 may comprise any structure suitable for resisting collapse of the at least one reinforced portion of the reservoir 3. The reinforcement structure 4 is rigid relative to the reservoir 3 although the container 1 may include other components which are more rigid than the reinforcement structure 4). A rigid material should be understood as being capable of resisting collapsing, and may also resist bending and/or stretching or any other form of deformation. The reinforcement structure 4 is not intended to collapse during use of the container 1, and therefore may be considered to be non-collapsible (although it will be appreciated that it may be possible to collapse the reinforcement structure by applying an external force significantly larger than that expected to be experienced by the reinforcement structure during use of the container 1). In some examples the reinforcement structure 4 is to prevent or limit movement, relative to the reinforcement structure, of the at least one reinforced portion of the reservoir 3.

The reinforcement structure 4 may resist collapse of the at least one reinforced portion of the reservoir 3 by being attached to the at least one reinforced portion (for example, using glue, fasteners, and the like). In some examples, in which the reservoir comprises a non-converging upper section 5 and a converging lower section 7, the upper section 5 forms the at least one reinforced portion. In some such examples, in which the upper section comprises two pairs of opposing, substantially vertical side walls, which together form a region of the reservoir 3 having a generally square or rectangular cross section, the at least one reinforced portion comprises a first one of the pairs of opposing side walls, to which the reservoir is attached, such that collapsing of the first pair of opposing side walls is resisted by the reinforcement structure 4 and collapsing of the second pair of opposing side walls, to which the reservoir is not attached, is not resisted by the reinforcement structure 4, or is resisted to a lesser extent. In some examples in which the reservoir 3 comprises a cylinder with a substantially vertical long axis (with respect to an intended in-use orientation), the at least one reinforced portion comprises a circumference of the cylinder, which may be spaced between an upper and lower extent thereof.

In some examples the reinforcement structure 4 comprises a box or other form of container, which surrounds part or all of the reservoir 3. The reinforcement structure 4 may comprise at least one side wall. In other examples the reinforcement structure 4 may comprise a frame or skeleton. In some examples the reinforcement structure 4 may comprise a band or ring, or more than one band or ring. The reinforcement structure 4 may be provided external to the reservoir 3, within an interior space of the reservoir 3, or may be incorporated into a structure of the reservoir 3 (for example, the reinforcement structure 4 could be provided between layers of a laminated wall material of the reservoir 3). In some examples the reinforcement structure 4 may be to provide one or several functions in addition to resisting flexing of the preselected wall portions of the reservoir. For example, the reinforcement structure 4 may protect the reservoir 3, facilitate stacking of the container 1, facilitate handling of the container 1, create an outer profile of the container 1, and the like. The reinforcement structure 4 may be formed of a low-cost, disposable, and/or recyclable material such as cardboard. The shape and/or configuration of the reinforcement structure 4 may be to facilitate folding of the reinforcement structure, for example, so that the reinforcement structure 4 can be transported in a substantially flat folded (for example, flat packed) state, prior to being incorporated into the container 1. The shape and/or configuration of the reinforcement structure 4 may be to facilitate folding of the container 1, for example, so that the container 1 can be transported in a substantially flat folded state, prior to being filled with build material.

The reinforcement structure 4 may have a predetermined shape and or configuration, for example, determined according to a particular intended use of the container 1. In some examples the shape and/or configuration of the reinforcement structure is determined in dependence on the shape and/or configuration of the reservoir 3. The shape and/or configuration of the reinforcement structure 4 may be determined to cooperate with the shape and/or configuration of the reservoir 3 to enable the reservoir 3 to adopt a predetermined partially collapsed form when a pressure within the reservoir 3 is sufficiently lower than a pressure outside of the reservoir to collapse the reservoir 3.

The predetermined partially collapsed form may be configured to guide build material 11 contained in the reservoir 3 to a preselected location within the reservoir (for example, a location from which build material can be removed by a build material removal system such as an aspiration system). In some examples the predetermined partially collapsed form has a lowest point (when the container is in an intended in-use orientation) corresponding to a location at which build material is able to be removed from the reservoir during use of the container to supply build material to a 3D printing system. In some examples the predetermined partially collapsed form is such that the walls of the reservoir 3 do not comprise any formations (for example, folds or pockets) which could trap build material. In addition, or alternatively, in some examples the predetermined partially collapsed form is such that the walls of the lower part 7 of the reservoir 3 do not comprise any horizontal features or regions. The volume of the reservoir having the partially collapsed form may be substantially the same as the volume of the reservoir when not collapsed (for example, the reservoir may deform without changing volume significantly). Alternatively, the volume of the reservoir having the partially collapsed form may be at least 80% of the volume of the reservoir when not collapsed.

Build material 11 which has sat undisturbed within the container 1 for a period of time may compact and/or form structures which prevent the build material from moving freely when removal of the build material from the container 1 is desired. A force applied by a build material removal system such as the suction force created by an aspiration system may not be effective to break up such structures, leading to incomplete removal of build material from the container 1. A transition of the reservoir 3 from a non-collapsed form to the partially collapsed form may facilitate breaking up structures in the build material. A predetermined partially collapsed form may be adopted to facilitate such break up of structures in the build material.

In the illustrated example of FIG. 1, the reinforcement structure 4 comprises an open-topped box having four substantially vertical side walls, and a substantially horizontal base. The side walls of the reinforcement structure 4 are adjacent to an external surface of the side walls 19 of the upper section 5 of the reservoir 3, whilst a space exists between the side walls 21 of the lower section 7 of the reservoir and the reinforcement structure side walls (by virtue of the converging shape of the lower section 7). The height of the reinforcement structure 4 is approximately equal to the height of the reservoir 3 (although other examples are possible in which the reinforcement structure is taller or shorter than the reservoir 3). The shape and configuration of the reinforcement structure 4 generally conforms to the shape and configuration of the upper section of the reservoir 3 (at least when the reservoir is in a filled state) such that there is little or no gap between the side walls 19 of the upper section 5 of the reservoir 3 and the side walls of the reinforcement structure 4.

An opposed pair of the side walls 19 of the upper section 5 of the reservoir 3 are glued to corresponding side walls of the reinforcement structure 4 and are thereby prevented from moving with respect to the reinforcement structure 4. The other two side walls 19 of the upper section 5 of the reservoir 3 are not attached to the reinforcement structure 4 and are free to move (within constraints imposed by their connection to the side walls which are attached to the reinforcement structure 4) with respect to the reinforcement structure 4. The non-attached side walls may therefore be considered to be relatively free to move (that is, they are free to move relative to the attached side walls, which are not free to move). A gas surrounding the container 1 is able to pass between at least some parts of the reservoir 3 and the reinforcement structure 4, for example, between the non-attached upper section side walls 19 and the corresponding side walls of the reinforcement structure 4, and between the lower section side walls 21 and the side walls of the reinforcement structure 4. A base part 9 of the lower section 7 of the reservoir 3 is glued to the base of the reinforcement structure 4, and is thereby prevented from moving with respect to the reinforcement structure 4. In the illustrated example the side walls 21 of the lower section 7 of the reservoir 3 are not attached to the reinforcement structure 4 and are (relatively) free to move with respect to the reinforcement structure 4.

The outlet structure 13 of the container 1 may comprise an opening connecting an interior space of the reservoir 3 to a space external to the reservoir 3. Although the primary function of the outlet structure 13 is to allow build material to exit the reservoir 3, in some examples the outlet structure 13 may also be to allow build material to pass into the reservoir 3. In the example illustrated in FIG. 1 the outlet structure 13 is provided in or near a top side 15 of the container 1. The outlet structure 13 may be adapted to connect to a corresponding collection apparatus that is to collect build material from the container 1. Such collection apparatus may be part of an additive manufacturing system. In the particular example shown by FIG. 1, the outlet structure comprises an aspiration tube 17, which extends downwardly within the interior space of the reservoir 3, to a point at or near a lowest extremity of the reservoir 3. The outlet structure 13 may comprise an actuable valve arrangement to restrict or prevent build material from passing through the structure when in a closed configuration or permit build material to pass through the structure when in an open configuration.

Figure 2:
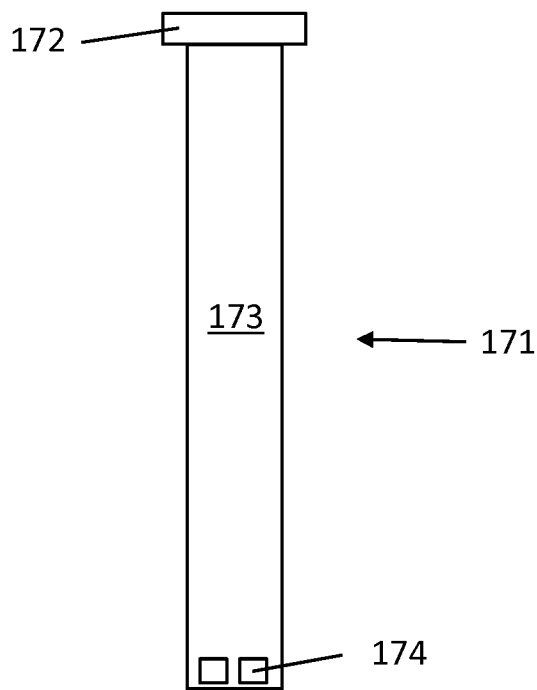
FIG. 2 is a schematic view of an example of a build material outlet structure.

FIG. 2 shows a particular example of an outlet structure in the form of an aspiration tube 171. The aspiration tube 171 comprises a connector 172, to be sealingly attached to the top part of a reservoir (for example, the reservoir 3) of a build material container (for example, the container 1). The connector 172 is further connectable to a vacuum source, for example, an aspiration system of an additive manufacturing system. The aspiration tube 317 further comprises a body section 173. An upper end of the body section 173 (as defined with respect to an intended in-use orientation of the aspiration tube, as shown in FIG. 2) is connected to the connector 172. The body section 173 comprises a hollow cylinder. An opening defined by the connector 173 may be in fluid communication with the interior of the body section 173. A lower end of the body section 173 comprises at least one opening 174 into the interior space of the body section 173. The length of the body section 173 may be such that the at least one opening 174 is located at or near a lower extremity of a reservoir when the aspiration tube is in use. When the aspiration tube is connected to a vacuum source, build material from the reservoir may enter the interior of the body section 173 through the at least one opening 174 and be sucked upwardly along the body section 173 and may thereby exit the container via the connector 172. In some examples the aspiration tube 171 may function to resist collapse of at least a part of the reservoir of a container in which the aspiration tube is disposed. In such examples, the aspiration tube may be considered to form part of the reinforcement structure of the container. Alternatively, the aspiration tube 171 may be considered to comprise an additional reinforcement structure of the container.

The inlet structure 14 may comprise an opening connecting an interior space of the reservoir 3 to a space external to the reservoir 3. Although the primary function of the inlet structure 14 is to allow a gas to enter the reservoir 3, in some examples the inlet structure 317 may also be to allow a gas to exit the reservoir 3. In the example illustrated in FIG. 1 the inlet structure 14 is provided in or near a top side 15 of the container 1. The inlet structure 14 may be to limit or otherwise control a parameter (for example, flow rate, flow volume) of a flow of gas into and/or out of the reservoir 3. In some examples the inlet structure 14 comprises a filter. In some examples the inlet structure 14 comprises a valve. In some examples the inlet structure 14 may be to allow build material to pass into the reservoir 3. For example, the build material 11 may be introduced into the reservoir 3 through the inlet structure 14 prior to use of the container 1 to supply build material to an additive manufacturing system, and air may enter the reservoir 3 through the inlet structure 14 during use of the container 1 to supply build material to an additive manufacturing system.

Figure 3A:
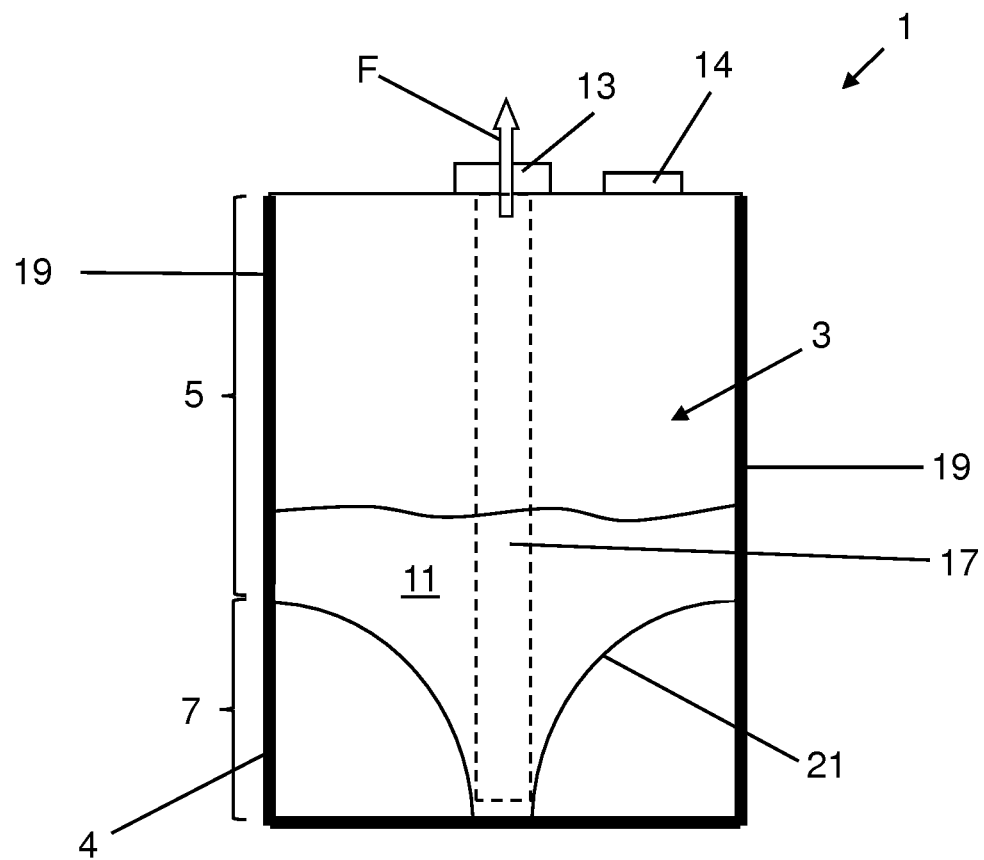
FIG. 3A is a schematic side view of an example of a build material container.
Figure 3B:
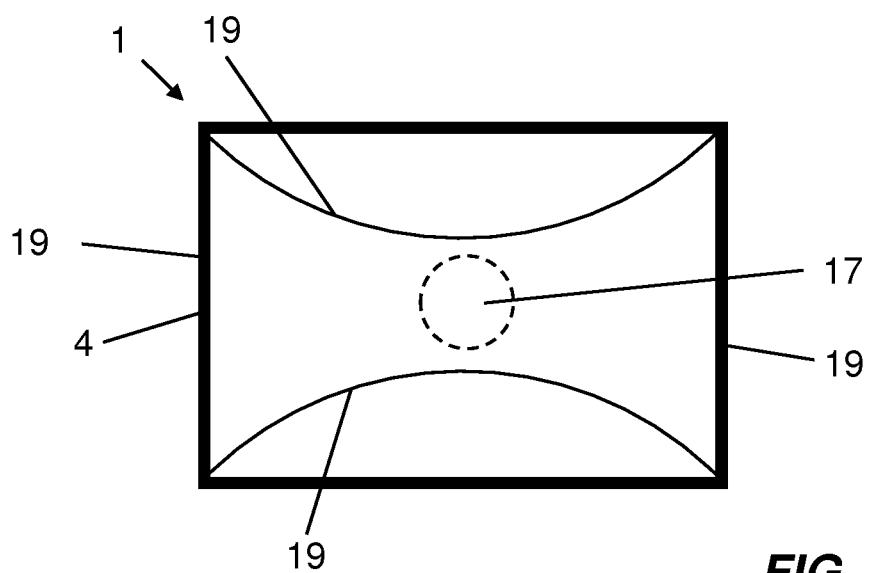
FIG. 3B is a schematic top view of the example build material container of FIG. 3A.

FIGS. 3A and 3B show the example container 1 of FIG. 1 in an in-use state in which the pressure within the reservoir 3 is sufficiently lower than the pressure outside of the reservoir 3 that the reservoir is partially collapsed as a result of this pressure differential. FIG. 3A is a side view of the container 1 and FIG. 3B is a top view of the container 1. The pressure differential may be created for example, by a vacuum source (not shown) connected to the outlet structure 13 which provides a suction force F. It can be seen from FIGS. 3A and 3B that the parts of the reservoir 3 which are not attached to the reinforcement structure 4 (for example, the side walls 21 of the lower part 7 and the side walls 19 of the upper part 5) have bowed inwardly, such that gaps are created between these parts of the reservoir 3 and the reinforcement structure 4. By contrast, the parts of the reservoir 3 which are attached to the reinforcement structure 4 (for example, the sidewalls 19 of the upper part 5) are prevented from moving under the influence of the suction force F.

Figure 4A:
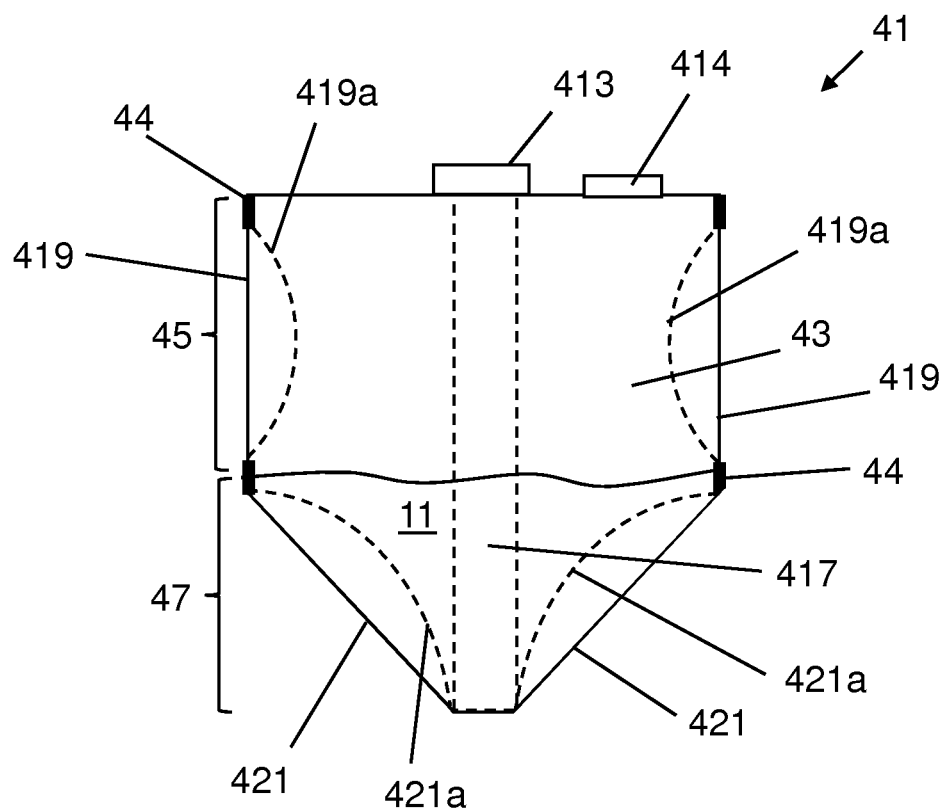
FIG. 4A is a schematic cross-section through a further example of a build material container.
Figure 4B:
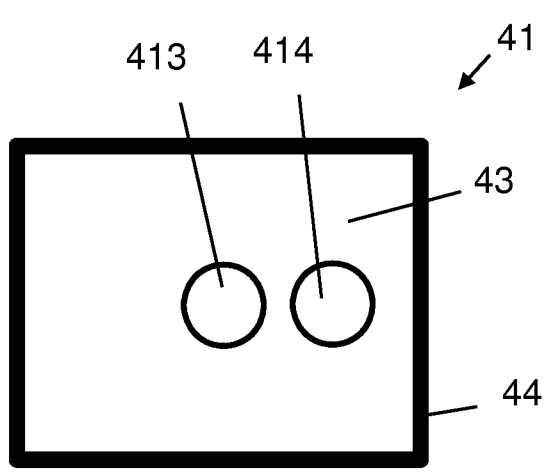
FIG. 4B is a schematic top view of the example build material container of FIG. 4A.
Figure 4C:
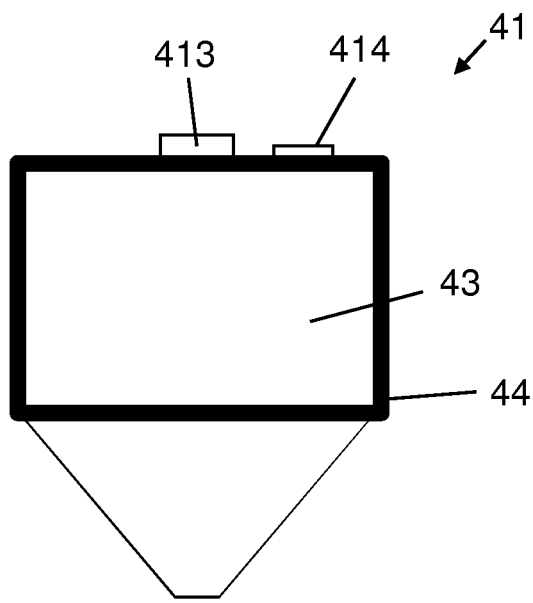
FIG. 4C is a schematic side view of the example build material container of FIG. 4A.

FIGS. 4A, 4B and 4C show a further example container 41. FIG. 4B is a top view of the container 41, FIG. 4C is a side view, and FIG. 4A is a cross section through the line X-X marked on FIG. 4B. The container 41 comprises a reservoir 43, a reinforcement structure 44, an outlet structure 413 (with aspiration tube 417), and an inlet structure 414, which may have any or all of the features of the corresponding structures of the container 1 described above. In the particular illustrated example container 41, the reinforcement structure 44 comprises a cuboidal frame formed from a plurality of relatively rigid bar sections. In the particular example, the reinforcement structure 44 is formed integrally with the material of the reservoir 43 (for example by disposing the bar sections between layers of reservoir material). The portions of the reservoir which comprise the bar sections may therefore be considered to be reinforced portions of the reservoir 43. In other examples the frame may be disposed internally to or externally to the reservoir 43, and the reservoir material may be attached to the frame, for example, by glue, fasteners or the like. The shape of the reservoir in a filled (and therefore uncollapsed) state is indicated by the solid line 419 and 421, whilst the shape of the bag when the reservoir is partially collapsed is indicated by the dashed line 419a and 421a. It can be seen from FIG. 4A that, in the partially collapsed state of the reservoir 43, the portions of the reservoir 43 which are not reinforced by the structure 44 have moved/bowed inwardly relative to their form and location in the uncollapsed state. The shape of the frame and the location of the reinforced reservoir portions cooperate to create a partially collapsed form comprising an upper part 45, which is non-converging over the height of the upper part, and a lower part 47 which converges toward the base of the container over the height of the lower part.

Figure 5:
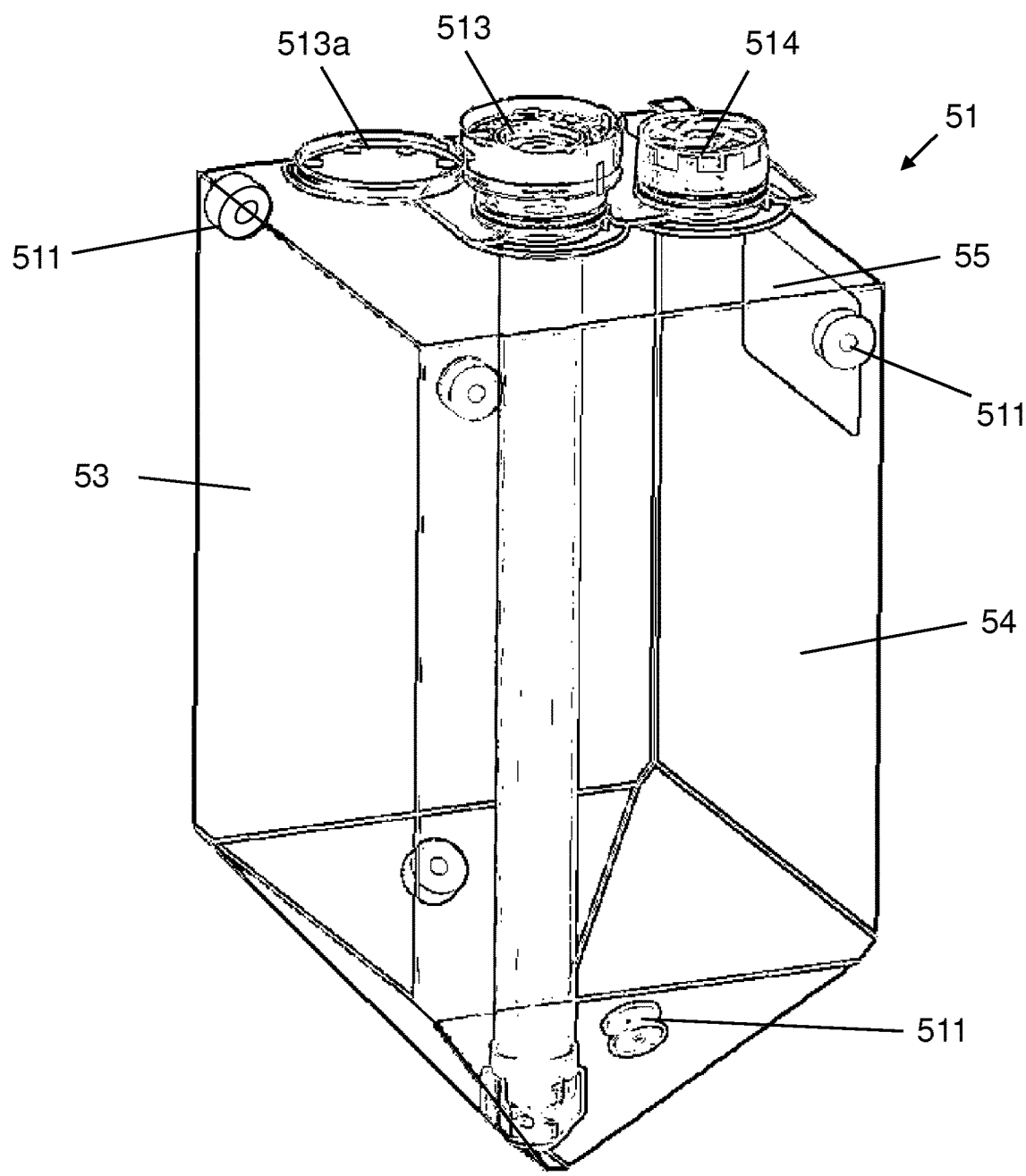
FIG. 5 is a perspective view of a further example of a build material container.

FIG. 5 shows a perspective view of a further example container 51. The container 51 comprises a reservoir 53, a reinforcement structure 54, an outlet structure 513, and an inlet structure 514, which may have any or all of the features of the corresponding structures of the container 1 described above. In the particular illustrated example, the outlet structure 513 comprises a captive lid 513a, which can be used to selectively close the outlet structure 513. It will be appreciated that other types of closure devices could alternatively be used. In the particular illustrated example container 51, the reservoir 53 comprises a cuboidal upper part and a pyramidal lower part, and the shape of the reinforcement structure 54 substantially conforms to the shape of the reservoir 53. The reinforcement structure 54 thereby comprises a box which encloses the reservoir 53. The reinforcement structure 54 is formed from a single piece of cardboard material. One side wall of the reinforcement structure 54 includes a window 55, which may, for example, permit a level of build material inside the reservoir 53 to be visually determined. Substantially all of the reservoir material is transparent in this particular example, although in other examples parts of the reservoir material not corresponding to the location of the window 55 may not be transparent. In examples which include a window 55, at least a portion of reservoir material visible through the window may be transparent. One pair of opposing side walls (in both upper and lower portions) of the reservoir 53 are attached to corresponding side walls of the reinforcement structure 54 by fasteners 511. The other side walls of the reservoir 53 are not attached to the reinforcement structure 54. The unattached side walls are slightly wider than the corresponding side walls of the reinforcement structure 54, to permit movement of these unattached side walls relative to the reinforcement structure 54. In this example the elasticity of the reservoir material is low, so the extra width enables the unattached side walls of the reservoir 53 to flex inwardly, away from the corresponding side walls of the reinforcement structure 54, for example, under the influence of a suction force applied to outlet structure 513 by an aspiration system.

Figure 6A:
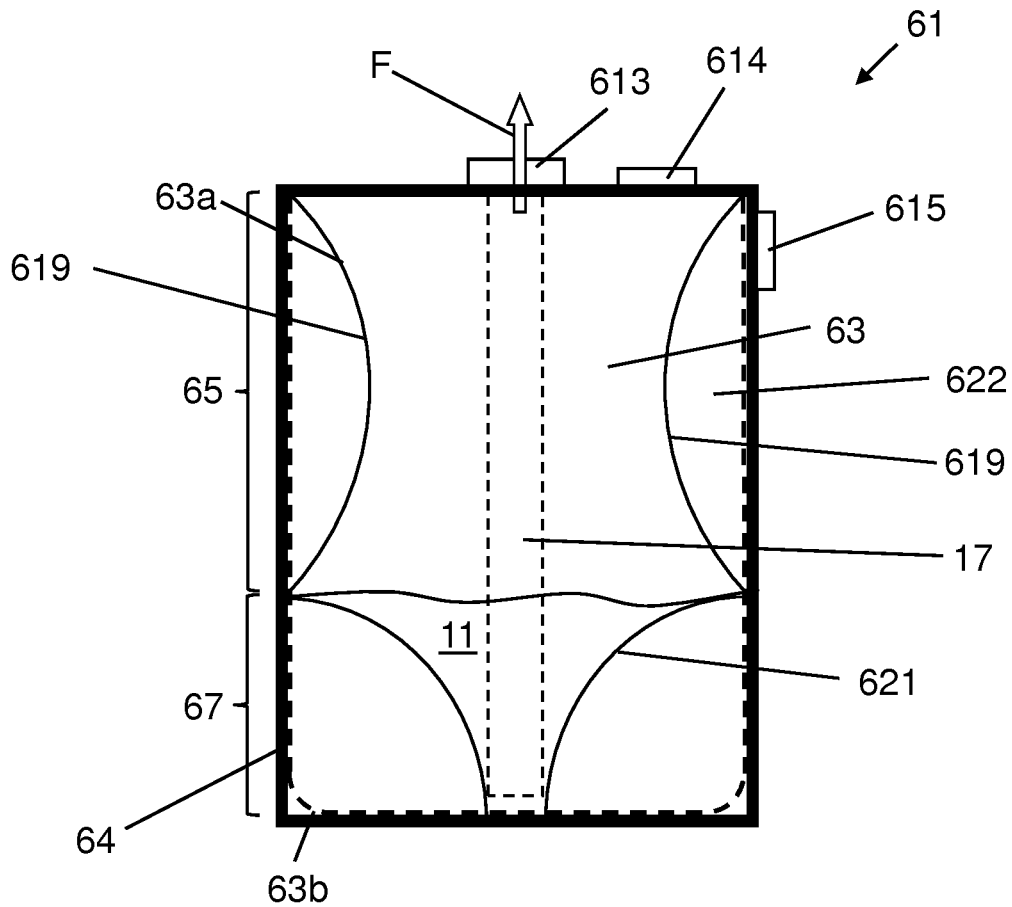
FIG. 6A is a schematic side view of a further example of a build material container.
Figure 6B:
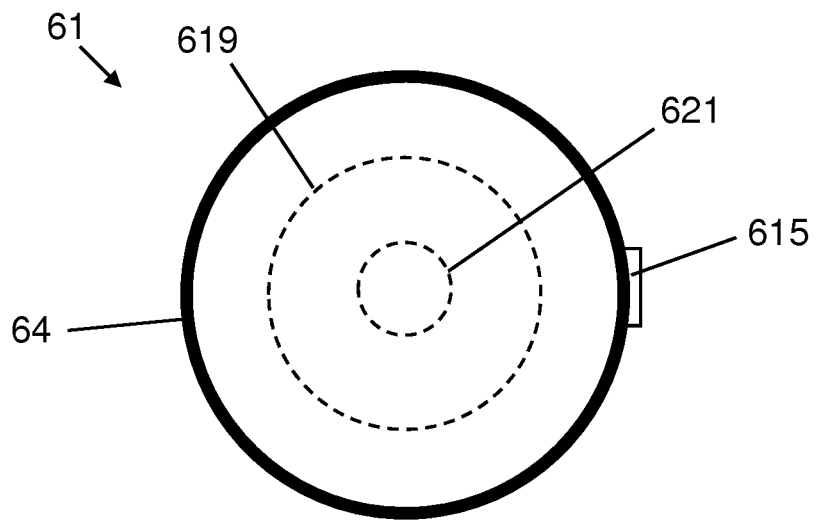
FIG. 6B is a schematic top view of the example build material container of FIG. 6A.

FIGS. 6A and 6B are side and top views respectively of a further example container 61. The container 61 is shown in an in-use state in which the pressure within a reservoir 63 of the container 61 is sufficiently lower than the pressure outside 622 the reservoir 63 that the reservoir 63 is partially collapsed as a result of this pressure differential. The container 61 comprises the reservoir 63, a reinforcement structure 64, an outlet structure 613, and an inlet structure 614, which may have any or all of the features of the corresponding structures of the container 1 described above. In the particular illustrated example container 61, the reinforcement structure 64 comprises a cylindrical barrel. The barrel is formed from a relatively rigid plastics material. The reservoir 63 comprises a bag formed from a relatively flexible and relatively elastic material. The bag is open at one end, and the edges of the open end are sealingly attached to the side wall of the barrel, at a top end of the barrel. The reservoir 63 is thereby defined by the bag and by a top end/wall of the barrel. The elasticity of the bag material is such that, when the container is filled with build material, the bag conforms to the shape of the reinforcement structure 64. The bag material may be stretched relative to a default unstretched state when the container is filled with build material. The shape of the bag in a filled (and therefore uncollapsed) state is indicated by the dashed line 63b, whilst the shape of the bag when the reservoir is partially collapsed is indicated by the solid line 63a. A narrow (relative to the total height of the reservoir) circumferential portion of the bag part of the reservoir 63 is attached (for example, by glue) to the reinforcement structure 64. A central portion of a lower end of the bag is also attached to a base wall of the reinforcement structure 64.

The material that forms the barrel in this example is airtight. Therefore, to permit the unattached portions of the reservoir to move away from the walls of the barrel in order for the reservoir 63 to adopt a partially collapsed form, the container comprises a further gas inlet structure 615 to allow a gas to enter a space between the reservoir and the outer structure. The further gas inlet structure 615 may be to selectively allow a gas to enter a space between the reservoir and the outer structure. The further gas inlet structure 615 is provided in a side wall of the reinforcement structure 64, near to the top of the container. The attached circumferential portion of the reservoir bag is not continuous around the circumference of the barrel, so that a gas may pass between an upper space between the reservoir and reinforcement structure (that is, a space above the attached portion) and a lower space between the reservoir and reinforcement structure (that is, a space below the attached portion). In other examples in which the attached portion comprises a complete and continuous circumference, an additional further gas inlet structure can be provided to allow a gas to enter the lower space.

It can be seen from FIGS. 6A and 6B that, in the partially collapsed state of the reservoir 63, the parts of the reservoir 63 which are not attached to the reinforcement structure 64 (that is, side walls 621 of the lower part 67 and side walls 619 of the upper part 65) have moved/bowed inwardly, such that gaps are created between these parts of the reservoir 63 and the reinforcement structure 64. Furthermore, the reservoir material has stretched such that the unattached parts have adopted a curved shape. The reservoir is therefore deformed, relative to a default state, when having the partially collapsed form. The elasticity of the reservoir material and the location of the reinforced portions cooperate to create a partially collapsed form comprising an upper part, which is non-converging over the height of the upper part, and a lower part which converges toward the base of the container over the height of the lower part.

The particular example of container 61 of FIGS. 6A and 6B may be suitable for containing relatively high volumes of build material, as compared to other examples of containers described herein. Furthermore, the example container 61 may be suitable for use to receive and store used build material, which has already been supplied to a 3D printing system for use in an additive manufacturing process and returned. Alternatively or additionally the container may be suitable for use to supply virgin build material to a 3D printing system.

Some example containers of this disclosure may be to facilitate transport of the containers in an unfilled state. Some such example containers may, for example, comprise features which permit the containers to be transported in a configuration which is relatively flat and/or takes up a relatively small volume, compared to an in-use configuration of those containers. Such example containers may comprise features to facilitate reconfiguration of the containers from the relatively flat configuration to the in-use configuration. The example containers described below with reference to FIGS. 7A to 8B comprise one or several features to facilitate transport of the containers in an unfilled state.

Figures 7A, 7B:
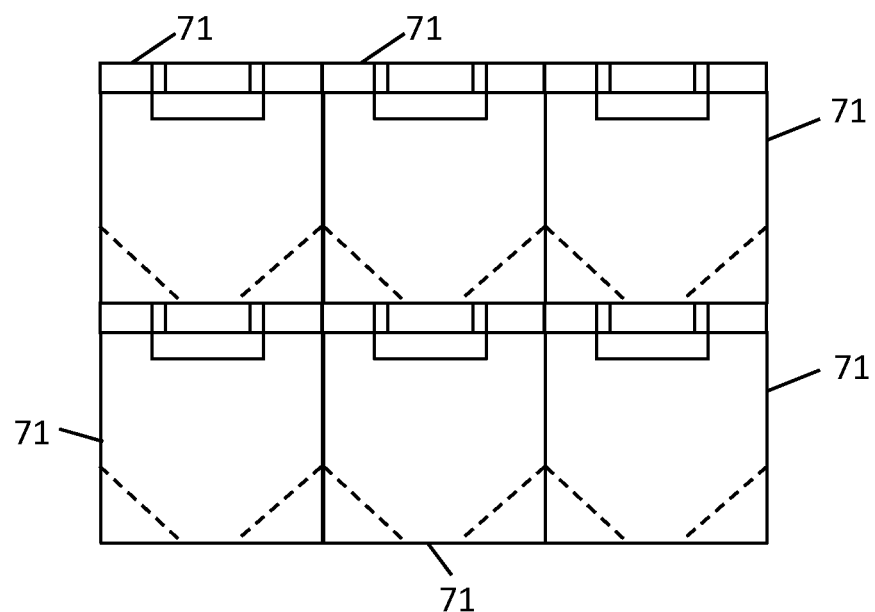
FIG. 7A is a schematic side view of a set of example build material containers in a relatively flat configuration.
FIG. 7B is a schematic side view of the set of example build material containers of FIG. 7A in an in-use configuration.

FIGS. 7A and 7B are side views of an arrangement of six example containers 71. Each container 71 may be a replaceable source container 71 that is to be connected to an additive manufacturing system in an at least partially filled condition so that the additive manufacturing system can collect build material from the container 71, and is to be removed after exhaustion of build material so as to be replaceable by a second or further, similar container filled with build material. Each container 71 may therefore be considered to be a 3D printing build material container. In one example the build material is powder, for example, of a type and/or particle size as described above.

Each container 71 may be of the same design. Alternatively, the containers 71 may be of varying designs. A given container 71 comprises a reservoir to hold build material. The container 71 further comprises a reinforcement structure attached to the reservoir at at least one selected location. The reinforcement structure may be to resist collapsing of at least one portion of the reservoir when the container is in the in-use configuration. The reservoir and the reinforcement structure are to permit reconfiguration of the container from a relatively flat configuration to an in-use configuration in which the reservoir is fillable with build material. In FIG. 7A each of the six containers is configured in the relatively flat configuration, and in FIG. 7B each of the six containers is configured in the in-use configuration. It can be seen from FIGS. 7A and 7B that the height of the stack of containers having the relatively flat configuration is significantly less than the height of the stack of containers having the in-use configuration. The reservoir and the reinforcement structure may comprise any of the features of the reservoir 3 and reinforcement structure 4, respectively, described above.

The container 71 may further comprise a build material outlet structure to allow build material to exit the reservoir, which may have any of the features of the build material outlet structure 13 described above. The container 71 may further comprise at least one gas inlet structure to allow a gas to enter the reservoir, which may have any of the features of the gas inlet structure 14 described above.

The volume occupied by the container in the in-use configuration may be significantly greater than the volume occupied by the container in the relatively flat configuration. The volume occupied by the container in the in-use configuration may be at least 50% greater than the volume occupied by the container in the relatively flat configuration. The volume occupied by the container in the in-use configuration may be at least 80% greater than the volume occupied by the container in the relatively flat configuration. In the relatively flat configuration a smallest external dimension of the container may have a relatively low value, and in the in-use configuration a smallest external dimension of the container may have a relatively high value.

One or both of the reservoir and the reinforcement structure may be foldable. In some examples the reinforcement structure comprises a pair of sections which, when the container is in the in-use configuration, form opposing side walls of a cuboidal structure, each section of the pair of sections being folded when the container is in the flat configuration. In some examples the reinforcement structure comprises a single piece of material. In some examples the reinforcement structure is formed of cardboard.

In some examples, the reservoir is relatively flexible and the reinforcement structure is relatively rigid. In some examples, when the container is the in-use configuration the reservoir comprises a non-converging upper section, which may, for example, have substantially vertical side walls, and a converging lower section, at least when in a filled and not collapsed state. In such examples the at least one selected location may be comprised in the upper section. In some examples the reinforcement structure comprises a non-converging upper section, which may, for example, have substantially vertical side walls, and a converging lower section.

A further example container (not illustrated) for facilitating transport of the container in an unfilled state may comprise an inner part, formed from a relatively flexible material, for receiving and retaining build material; and an outer part, formed from a relatively rigid material, disposed around the inner part and connected at one or more locations to the inner part. The further example container is reconfigurable between a first configuration in which a smallest external dimension of the container has a relatively low value, and a second configuration in which a smallest external dimension of the container has a relatively high value.

Figure 8A:
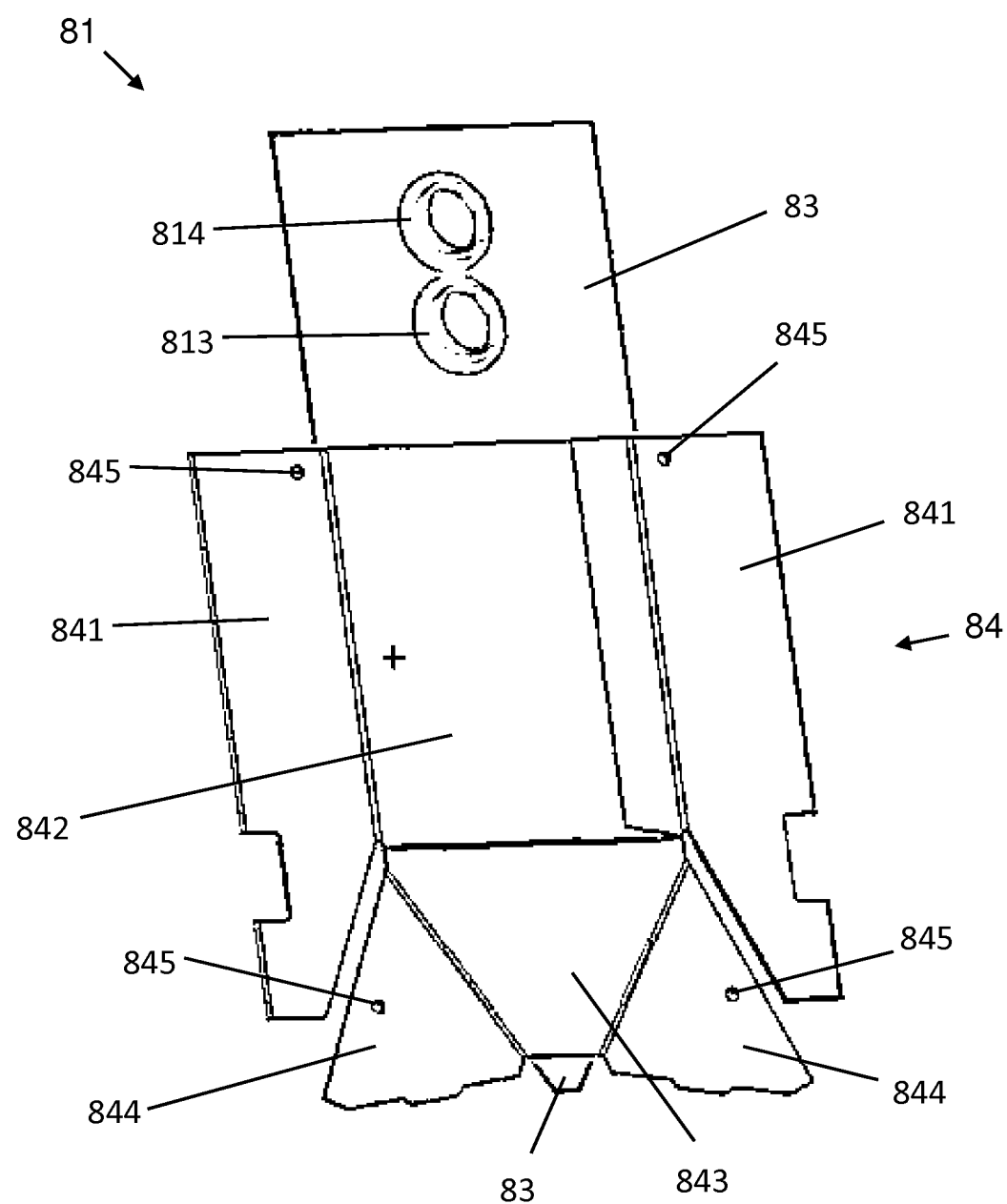
FIG. 8A is a perspective view of a further example build material container in a relatively flat configuration.
Figure 8B:
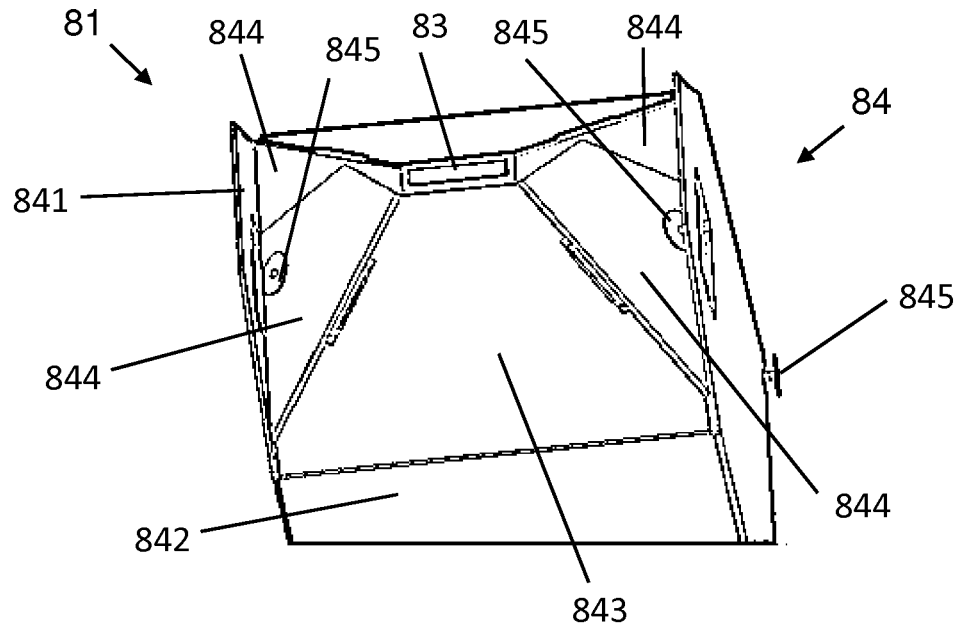
FIG. 8B is a partial perspective view of the example build material container of FIG. 7A in an in-use configuration.

FIGS. 8A and 8B show a further example container 81. The container 81 comprises a reservoir 83, a reinforcement structure 84, an inlet structure 814 and an outlet structure 813, which may have any of the features of the corresponding structures of the container 81 described above. FIG. 8A is a top view of the container 81 in a relatively flat configuration, and FIG. 8B is a partial perspective view of a base end of the container 81 in an in-use configuration.

The shape and material properties of the reservoir 83 may be the same as those of the reservoir 43 of the container 41 described above. For example, the reservoir may be formed from a flexible plastics material having a low elasticity. The reservoir is foldable by collapsing a first pair of opposing side walls of the reservoir inwardly until they are folded, causing the second pair of side walls to move toward each other whilst remaining substantially straight (i.e. unfolded). A fold line or crease, which is substantially parallel to and equidistant from each edge of each of the collapsible opposing side walls, may be provided and assist in controlling how the side walls collapse. In effect, collapse then occurs by the collapsible opposing side walls folding inwardly along the fold lines when the structure is collapsed. Alternatively, collapse may occur by the collapsible opposing side walls folding outwardly along the fold lines when the structure is collapsed, although by this approach the flattened reservoir would inhabit a larger footprint. Other such fold lines or creases may be deployed to assist in controlling collapse in a similar fashion. The distance between the second pair of side walls is significantly less when the reservoir 83 is folded than when the reservoir 83 is unfolded. The shape of the reservoir 83 is such that, when folded, a portion of the reservoir in which the inlet structure 814 and the outlet structure 813 are provided remains substantially straight.

The shape of the reinforcement structure 84, in the in-use configuration, is similar to the shape of the reinforcement structure 54 of the container 51 described above, such that the reinforcement structure 84 comprises a first upper pair of non-converging opposing side walls, a second upper pair of non-converging opposing side walls, and four converging lower side walls. However, one of the upper pairs of opposing side walls extends for the full height of the reinforcement structure 84 (that is, the combined height of the upper and lower sections). The lower ends of these extended side walls can thereby cooperate with the base of the converging lower section to support and maintain the container in an upright, in-use orientation.

The reinforcement structure 84 may be formed from a single piece of cardboard comprising a pair of extended side panels 841, a pair of non-extended side panels 842 (of which only one is visible in FIGS. 8A and 8B), a pair of lower section side panels 843, each of which is joined to a lower edge of a non-extended side panel 842, and two pairs of lower section flaps 844 (of which only one pair is visible in FIG. 8A). The extended side panels 841 are extended in the sense that they have a greater height (relative to an in-use orientation) than the non-extended side panels 842. Each lower section flap of a given pair of lower section flaps 844 is joined to a different edge of a given lower section side panel 843. Various holes 845 are provided in the reinforcement structure 84. The holes 845 may be to receive fasteners, for example, for attaching a first part of the reinforcement structure to a second part in the in-use configuration, and/or for attaching the reservoir to the reinforcement structure. The lower section side panels and lower section flaps are shaped such that they cooperate to form a pyramidal structure when the container 81 is in the in-use configuration (as is illustrated in FIG. 8B). The joins between the various panels and flaps are to allow angular movement between the joined parts, around the axis of the join.

Figure 8C:
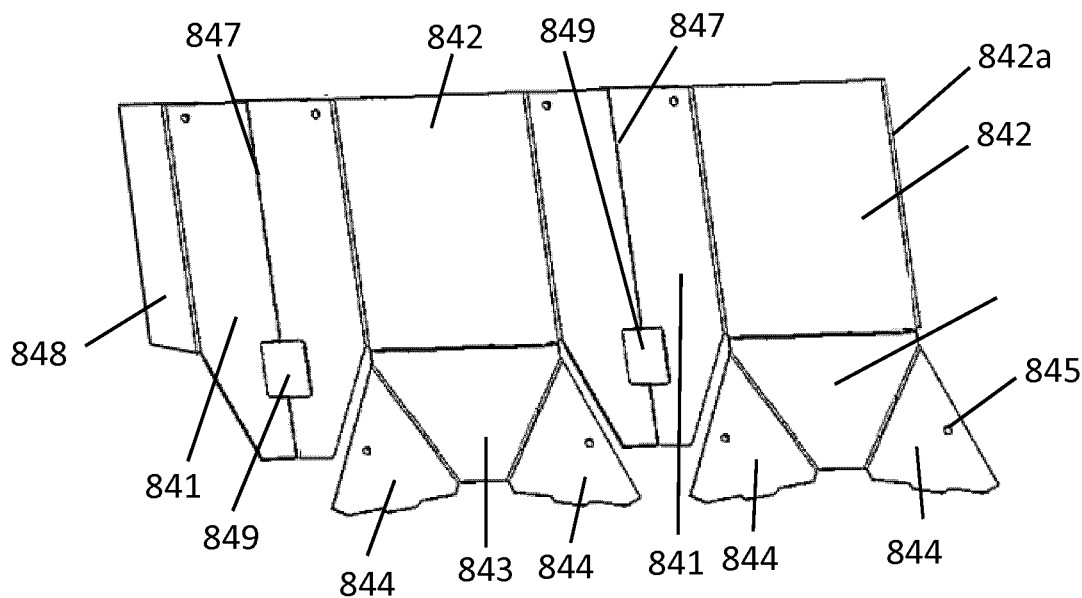
FIG. 8C is a perspective view of an example piece of material to form an example reinforcement structure.

FIG. 8C shows a single piece of material, in an unfolded and unassembled state, from which the reinforcement structure 84 may be formed. It can be seen from FIG. 8C that each of the extended side panels 841 includes a window 849. In examples in which the reservoir 83 is formed from a transparent material, these windows can be used to view the level of build material contained in the reservoir 83. It can also be seen that each extended side panel 841 comprises a central fold-line, crease or hinge 847. These creases allow the extended side panels to fold and unfold during a transition between the relatively flat configuration and the in-use configuration of the container 81. One of the extended side panels 841 has a tab 848 protruding from the long edge which is not joined to another side panel. To assemble the reinforcement structure, the tab 848 is glued or otherwise attached or secured to a free long edge 842a of a non-extended side panel 842. The material piece thereby forms a continuous loop. During assembly of the container, the reservoir 83 may be attached to the material piece of the reinforcement structure 84 at the at least one selected location, before or after the material piece is formed into a loop.

To reconfigure the container 81 from the relatively flat configuration shown in FIG. 8A to the in-use configuration shown in FIG. 8B, the extended side panels 841 are unfolded, which causes the reinforcement structure 84 to adopt a substantially cuboidal shape. The reservoir 83 may become simultaneously unfolded and/or expanded, by virtue of the attachment between the reservoir 83 and the reinforcement structure 84. To create the pyramidal shape of the converging lower section of the reinforcement structure, the flaps 844 connected to a first lower section side panel 843 are overlapped with and attached to corresponding flaps 844 of the second lower section side panel 843, as shown in FIG. 8B. The attachment of the flaps 844 may be effected, for example, by gluing and/or by inserting fasteners through the holes 845 in the flaps 845. Such fasteners may additionally attach the flaps 844 to the reservoir 83. The container 84 may be reconfigured back to the relatively flat configuration by reversing the above-described process.

In some examples, a container may further comprise a support structure to retain the reinforcement structure in the in-use configuration. The support structure may be separable from the reinforcement structure and the reservoir when the container is in the flat configuration, and connected to the reinforcement structure when the container is in the in-use configuration. The support structure may be foldable. The support structure may be reconfigurable between a relatively flat configuration and an in-use configuration. The shape of the support structure may correspond to the shape of the reinforcement structure. The support structure may comprise a sleeve or box shaped to surround part or all of the reinforcement structure.

A particular example support structure (not illustrated) of the container 81 comprises an open-ended cardboard sleeve shaped to fit snugly over the reinforcement structure 84 in the in-use configuration. The support structure is cuboidal in an in-use configuration, and has four side panels, each of which corresponds to a side panel of the reinforcement structure 84. The support structure is to fold at the joins between side panels, but none of the side panels are foldable in themselves. In the relatively flat configuration, the support structure has two side panels which each have a free vertical (with respect to an intended in-use orientation) edge. The free vertical edges are located at opposite ends of the support structure in the relatively flat configuration. Reconfiguring the support structure comprises attaching the two free vertical edges together. Before or after the free vertical edges are attached together, the support structure is disposed around the reinforcement structure 84. The support structure may be attached to the reinforcement structure 84, for example, using glue or fasteners, or alternatively may be to remain disposed around the reinforcement structure by virtue of frictional contact between the side panels of the reinforcement structure 84 and the side panels of the support structure. The side panels of the support structure are relatively stiff and unable to fold compared to the extended side panels 841 of the reinforcement structure 84. The support structure may therefore resist folding of the extended side panels 841, and thereby assist to retain the reinforcement structure 84 in the in-use configuration.

Some example containers of this disclosure may be to facilitate handling of the containers in a filled state. Some such example containers may, for example, comprise features which permit the containers to be lifted and carried comfortably by a person. Some such example containers may, for example, comprise features which facilitate tipping, upending or otherwise manipulating a container by a person, for example, to empty build material manually from that container. The example containers described below with reference to FIGS. 9 to 11 comprise one or several features to facilitate handling of the containers in a filled state.

Figure 9:
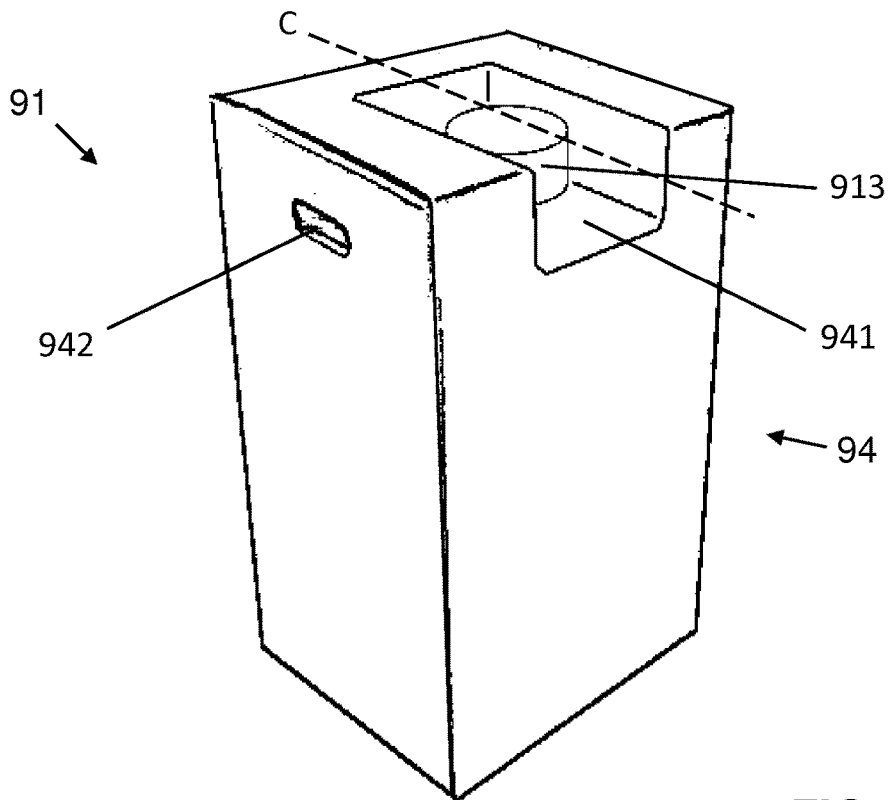
FIG. 9 is a perspective view of a further example build material container.

FIG. 9 is a perspective view of an example container 91, in an in-use orientation. The container 91 may be a replaceable source container 91 that is to be connected to an additive manufacturing system in an at least partially filled condition so that the additive manufacturing system can collect build material from the container 91, and is to be removed after exhaustion so as to be replaceable by a second or further similar container filled with build material. The container 91 may therefore be considered to be a 3D printing build material container. In one example the build material is powder, for example, of a type and/or particle size as described above.

The container 91 is for holding build material and comprises a build material outlet structure 913 to allow build material to exit an internal space of the container 91. An external surface of the container includes a recessed portion 941. The recessed portion 941 supports the build material outlet structure 913. The build material outlet structure may have any of the features of the build material outlet structures of the containers 1, 41, 51, 61, or 71 described above.

In some examples the container 91 further comprises a reservoir (not visible) to hold build material and an outer structure 94 disposed around the reservoir. In such examples the build material outlet structure 913 is to allow build material to exit the reservoir. The reservoir may have any of the features of the corresponding structures of the containers 1, 41, 51, 61 or 71 described above. The outer structure forms an external surface of the container and includes a recessed portion 941 in the external surface. In the example shown the recessed portion is in an upper portion of container 91. The container 91 may further comprise a gas inlet structure (not shown) to allow a gas to enter the reservoir, which may have any of the features of the gas inlet structure 14 described above. Such a gas inlet structure may be supported by the recessed portion 941, for example in a similar manner to the build material outlet structure 913.

The recessed portion 941 supports the outlet structure 913. The outer structure may comprise a reinforcement structure having any of the features of the reinforcement structures described above. The outer structure may comprise a support structure having any of the features of the support structures described above. The recessed portion 941 is such that a part of a top surface (with respect to the in-use orientation) of the container 91 is recessed, and a part of a side surface of the container is recessed. With respect to the top surface, the recessed portion 941 may be located centrally such that a notional centre-line C of the recessed portion is equidistantly spaced from two parallel opposing edges of the top surface. The recessed portion 941 may then be bounded on at least two sides by upstanding shoulder portions having upper surfaces that coincide with the top surface of the container. In the example shown, the recessed portion is bounded on three sides by an upstanding shoulder portion. In any case, the two or three upstanding shoulder portions act to protect any structural elements that are located in the recessed portion and to reinforce the container 91 around the recessed portion. A top edge of the container is thereby interrupted by the recessed portion 941. In other examples the recessed portion may be such that a part of a top surface of the container is recessed and no side surfaces are recessed, whereby there are then effectively four shoulder portions surrounding the recessed portion, or such that a part of a side surface of the container is recessed and the top surface is not recessed. The recessed portion may have a generally square or rectangular cuboid form, although other forms are possible.

An external part of the outlet structure 913 may be contained within the recessed portion 941 such that the outlet structure does not protrude from the external surface (for example, the external part of the outlet structure remains within the external boundaries of a respective notional square or rectangular cuboid form of the recessed portion). In some examples an external part of the outlet structure 913 (and any other structure supported by the recessed portion 941, such as a gas inlet structure) may be entirely contained within the recessed portion 941. This feature may protect the outlet structure (and any other structure supported by the recessed portion 941) from damage during storage, transport or other handling of the container 91, and/or may facilitate stacking of the container 91. The shoulder portions act to reinforce the container around the recessed portion. Having equally-broad opposing shoulder portions on either side of the recessed portion acts to provide equal and even supporting strength across the top surface of the container, which may assist in stacking of the container(s). A top surface of the outlet structure 913 may be lower than a top surface of the outer structure 94, and may thereby be lower than a top surface of the container 91. A top surface of the outlet structure 913 may be in the same plane as a top surface of the outer structure 94, and/or in the same plane as a top surface of the container 91. The outlet structure may be located in a generally central location with respect to at least two opposing edges of the top surface of the container. The outlet structure may be located in a generally central location with respect to the entire top surface of the container. This may facilitate efficient extraction of build material from the container and may also facilitate the provision of equally broad shoulders on at least either side of the container, in order to provide an even supporting strength across the top surface of the container, for example, for stacking purposes.

In the illustrated example, the container 91 further comprises a pair of handles 942 (of which only one is visible) provided on opposite sides of the outer structure 94. The handles 942 comprise cut-outs (i.e. openings in the walls of the outer structure 94). In other examples the handles may comprise recesses, or structures attached to the outer surface of the outer structure. The handles 942 may be formed integrally with the outer structure. The handles may be comprised in a top third of the overall height of the container, when the container is in an in-use orientation.

The dimensions of the outer structure may be selected to facilitate lifting and/or carrying of the container 91 by a person. For example, the width of the outer structure 94, between the pair of handles 942, may be greater than a depth of the outer structure, and the width and depth may be less than a height of the outer structure. The volume of the reservoir may be in the range 20-70 L. The volume of the reservoir may be in the range 20-100 L. In some examples the volume of the reservoir may be smaller than 20 L. In some examples the volume of the reservoir may be greater than 100 L. The height of the outer structure may be in the range 0.3-1 m. In some examples the height of the outer structure may be smaller than 0.3 m. In some examples the height of the outer structure may be greater than 1 m. The height of the outer structure may be in the range 0.5-0.75 m. The height of the outer structure may be approximately 0.55 m. The width of the outer structure between the handles may be in the range 0.25-0.5 m. The width of the outer structure between the handles may be in the range 0.1-0.75 m. In some examples the width of the outer structure between the handles may be smaller than 0.25 m. In some examples the width of the outer structure between the handles may be greater than 0.75 m. The width of the outer structure between the handles may be approximately 0.3 m. The depth of the outer structure may be in the range 0.1-0.75 m. In some examples the depth of the outer structure may be smaller than 0.1 m. In some examples the depth of the outer structure may be greater than 0.75 m. The depth of the outer structure may be in the range 0.2-0.5 m. The depth of the outer structure may be approximately 0.2 m.

The outer structure 94 may be formed from a single piece of material. The outer structure 94 may be formed from cardboard. One or both of the reservoir and the outer structure 94 may be foldable. In some examples, the reservoir is collapsible and the outer structure 94 comprises a relatively rigid reinforcement structure to resist collapsing of at least one reinforced portion of the reservoir. In other examples, the reservoir is collapsible and the container 91 further comprises a relatively rigid reinforcement structure to resist collapsing of at least one reinforced portion of the reservoir. In such examples the reinforcement structure may be disposed between the reservoir and the outer structure 94. The outer structure 94 may be to allow a gas to enter a space between the outer structure 94 and the reservoir.

Figures 10A, 10B:
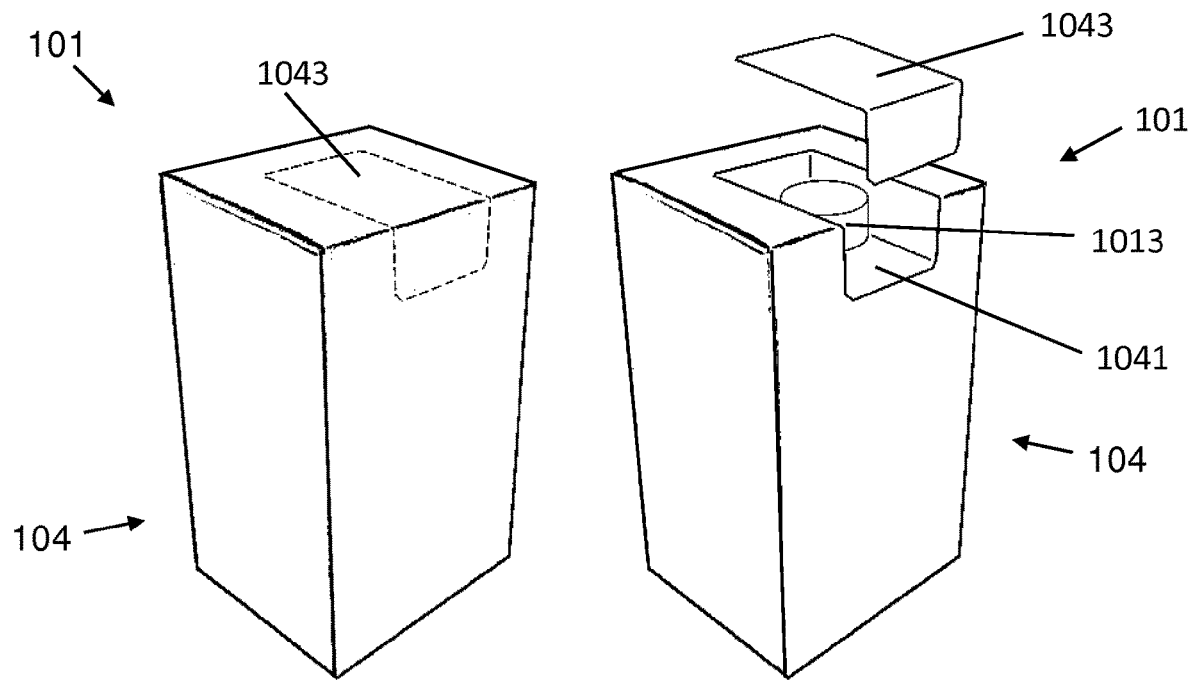
FIG. 10A is a perspective view of a further example build material container.
FIG. 10B is a perspective view of the example build material container of FIG. 9A.

FIGS. 10A and 10B are perspective views of a further example container 101, shown in an in-use orientation. The container 101 comprises a reservoir (not visible); a build material outlet structure 1013; an outer structure 104; and a recessed portion 1041, which may have any of the features of the corresponding structures of the container 91 described above. The container 101 further comprises a removable portion of material 1043 disposed over the recessed portion 1041, such that an external part of the outlet structure is enclosed in a space bounded by the recessed portion of the outer structure 104 and the removable portion of material 1043. In FIG. 10A the removable portion 1043 is disposed on the container 101, and in FIG. 10B the removable portion 1043 has been removed from the container 101. The removable portion of material 1043 may be integral with the outer structure, at least prior to its removal from the container 101. The outer structure 104 may comprise cardboard, and the removable portion of material 1043 may be defined by a perforated or otherwise weakened line to facilitate breaking of the cardboard at edges of the removable portion 1043. The removable portion 1043 may form part of a top surface of the outer structure 104. The removable portion 1043 may form part of a side surface of the outer structure 104. The removable portion 1043 may include one or several features (for example, a cut-out, a protrusion, a tab, a handle, and the like) to facilitate removal of the removable portion 1043 from the container 101. In any event, the removable portion 1043 (before being removed) provides additional protection for any elements, such as the outlet structure 1013, which are within the recessed portion.

Figure 11:
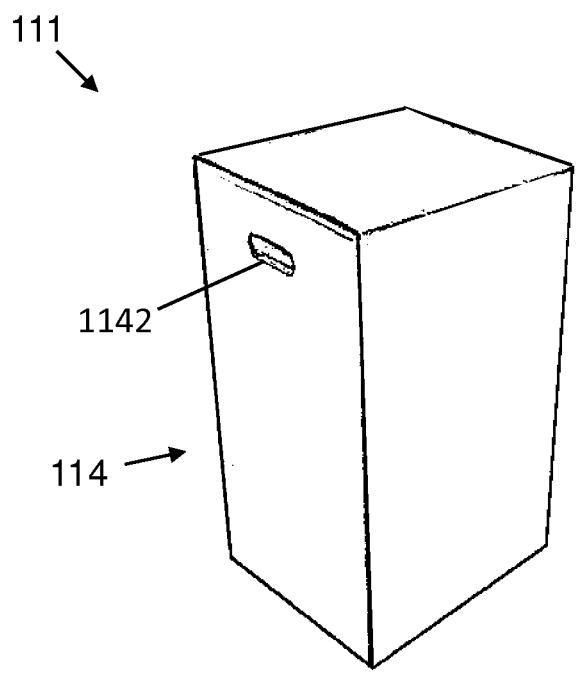
FIG. 11 is a perspective view of a further example build material container.

FIG. 11 is a perspective view of a further example container 111. The container 111 is for holding build material and comprises a pair of handles 1142 on opposite sides of the container (of which only one is visible). A width of the container between the handles 1142, is greater than a depth of the container and less than a height of the container.

In some examples the container 111 comprises a reservoir (not visible); a build material outlet structure (not visible); and an outer structure 114 which may have any of the features of the corresponding structures of the container 91 or the container 101 described above. In such examples the pair of handles 1142 may be provided on opposite sides of the outer structure and a width of the outer structure between the handles 1142 may be greater than a depth of the outer structure and less than a height of the outer structure.

Figure 12:
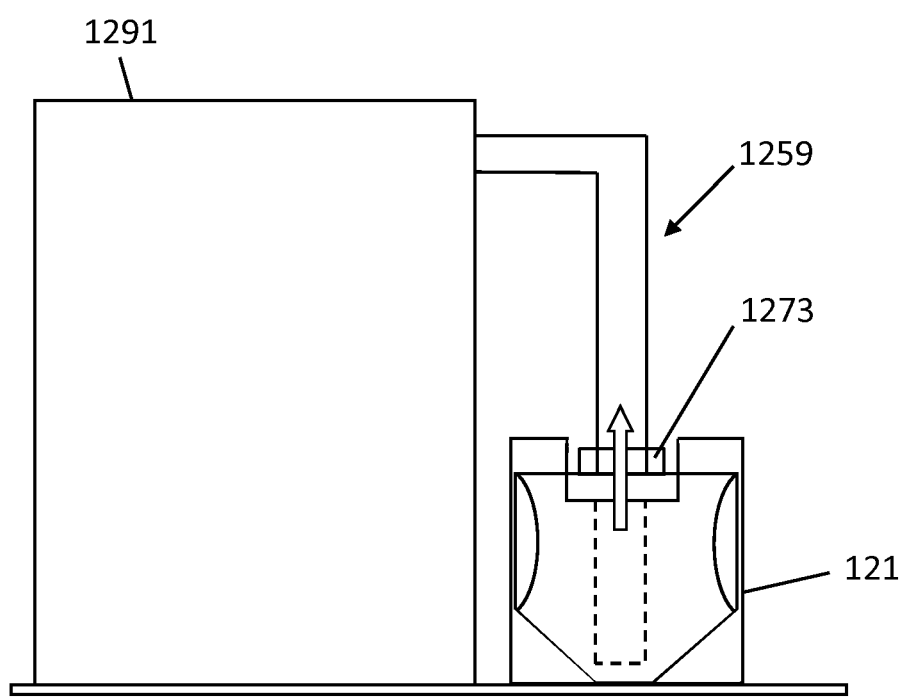
FIG. 12 is a schematic view of an example build material container in use with an example 3D printing system.

FIG. 12 shows an example container 121 in use to supply build material to a 3D printing system 1291, via a build material removal arrangement 1259. The build material removal arrangement 1259 is connected to a build material outlet structure 1273 of the container 121 using any suitable connection technique, (for example, via corresponding magnetic connectors provided on the outlet structure 1273 and on a connection member of the build material removal system 1259). The container 121 and structures comprised therein may have any of the features described above in relation to the containers 1, 41, 51, 61, 71, 81, 91, 101 or 111. The 3D printing system may be an additive manufacturing system for generating 3D objects using build material. The 3D printing system may comprise a 3D printing part and a separate build material management part. Alternatively, the 3D printing system may comprise a 3D printing function and a build material management function incorporated within a single device. The build material removal system may comprise an aspiration system, which extracts build material from the container via suction.

Figure 13:
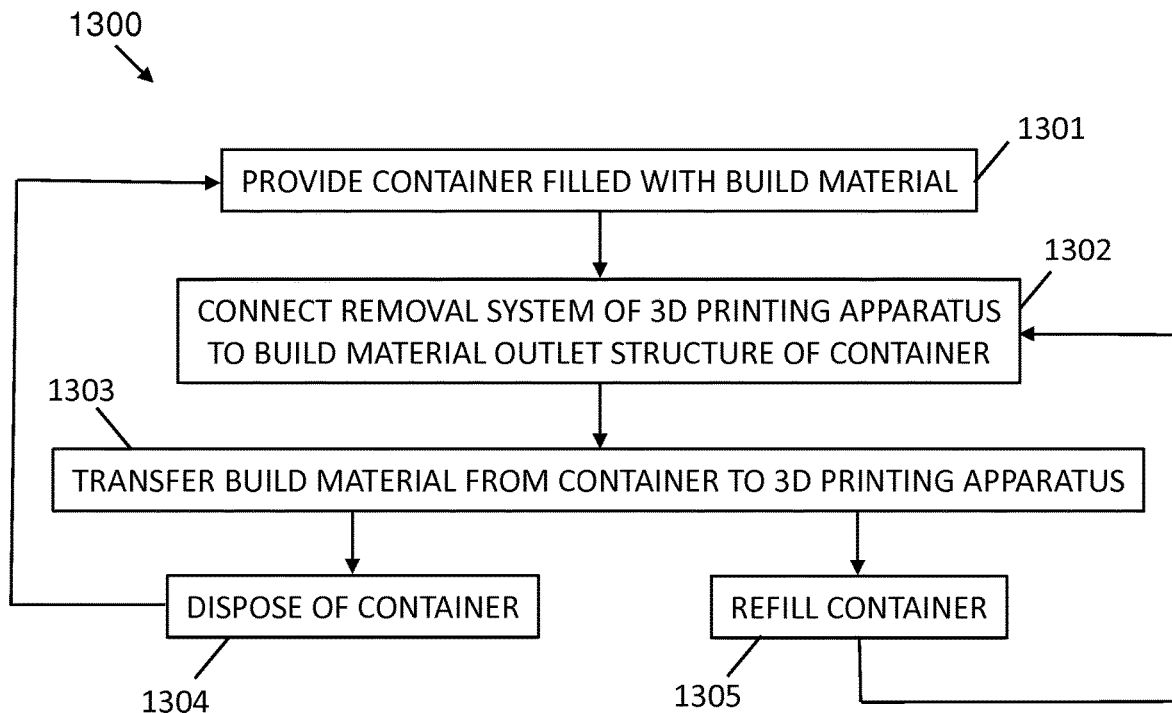
FIG. 13 is a flow chart of an example method for supplying build material to a 3D printing system from a container.
Figure 14:
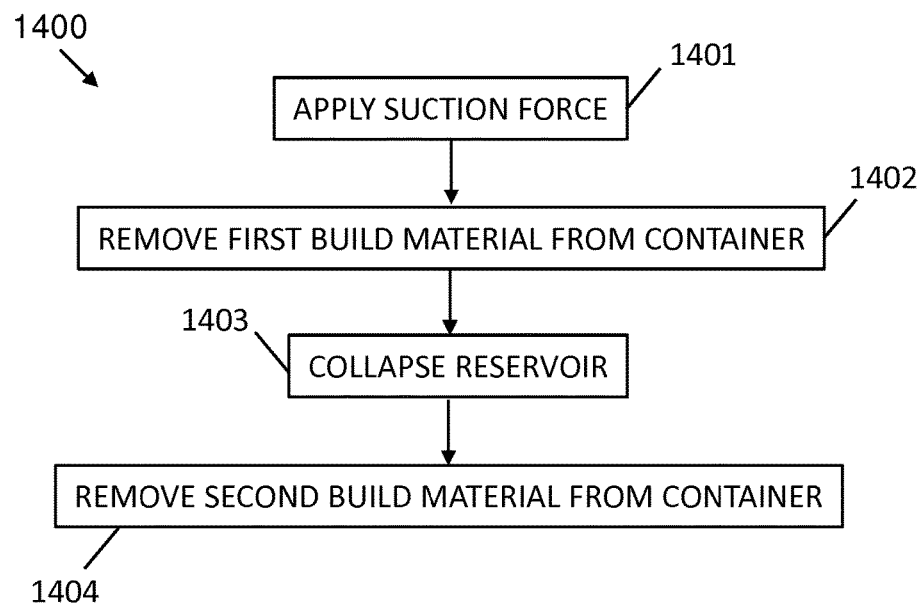
FIG. 14 is a flow chart of an example method for removing build material from a container.

FIGS. 13 and 14 are flowcharts that implement examples of methods for supplying build material from the example container 121 to a 3D printing system 1291. Reference is made to the diagrams of FIGS. 1 to 12 to provide contextual examples. Implementation, however, is not limited to those examples.

FIG. 13 illustrates an example method 1300, for example, of supplying build material to a 3D printing system from a container. In block 1301 a container (for example, the container 131) which is filled with build material is provided. The build material may be virgin build material. The build material may be used build material. Providing the container may include any or all of manufacturing, transporting, storing, assembling and/or filling the container. In some examples providing the container comprises reconfiguring the container from a substantially flat configuration to an in-use configuration and then filling the container with virgin build material. Providing the container may comprise arranging the container near or adjacent to the 3D printing apparatus, as shown in FIG. 12. Providing the container may comprise arranging the container in a location reachable by a connection member of a build material removal system.

In block 1302 a build material removal system of a 3D printing apparatus (for example, the 3D printing system 1291) is connected to a build material outlet structure of the container. Connecting the removal system to the outlet structure may comprise mating a connector of the removal system to a corresponding connector of the outlet structure. The connector of the removal system may be provided, for example, at a distal end of a connection member. In examples in which the removal system comprises an aspiration system, such a connection member may comprise a vacuum hose. Connecting the removal system to the outlet structure may comprise creating an airtight seal between the removal system and the outlet structure. In some examples, for example, examples in which the 3D printing apparatus does not comprise a build material removal system, this block may be omitted.

In block 1303 build material is transferred from the container to the 3D printing apparatus. Transferring the build material may comprise, for example, activating a build material removal system of the 3D printing apparatus. Transferring the build material may comprise applying a suction force (as indicated by the block arrow in FIG. 12) to an internal space of a reservoir of the container. Transferring the build material may comprise aspirating a reservoir of the container. In examples in which the outlet structure has not been connected to a removal system of the 3D printing apparatus, transferring the build material may comprise manually tipping the container such that build material flows out of the outlet structure and into an inlet structure of the 3D printing apparatus. Material may be continuously transferred from the container to the 3D printing apparatus until the container is empty. Material may be transferred discontinuously, for example, if a given 3D printing job is to use less build material than is contained in the container.

FIG. 14 illustrates an example method 1400, for example, of transferring build material from a container (for example, the container 121) to a 3D printing system (for example, the 3D printing system 1291). The example method 1400 may be performed as part of block 1303 of the example method 1300. The example method 1400 may be implemented by a container comprising a collapsible reservoir to hold build material and a relatively rigid reinforcement structure to resist collapsing of at least one reinforced portion of the reservoir (for example, a container having the features of any of the containers 1, 41 or 51). The example method 1400 may be implemented by a 3D printing system having a build material removal system in the form of an aspiration system.

In block 1401 a suction force is applied, for example, to an internal space of the reservoir of the container. The suction force may be applied via an aspiration tube extending into the internal space of the reservoir. The suction force may thereby be applied at a location at or near a bottom end of the reservoir. The suction force may have a predetermined magnitude. The predetermined magnitude may be determined based on factors such as the material properties of the build material, the material properties of the reservoir, the size of the reservoir, the shape of the reservoir, the amount of build material contained in the reservoir, and the like. The suction force may be generated by the aspiration system, using any suitable technique.

In block 1402 first build material is removed from the container. Removing first build material from the container may comprise removing first build material from the reservoir. Removing first build material from the container may comprise transporting first build material through an aspiration tube, for example, under the influence of the suction force. Removing first build material from the container may comprise creating a flow of gas (for example, by allowing a gas to enter through a gas inlet structure of the container) through the reservoir and entraining build material in the airflow. The gas may be air. In some examples the gas may be a gas other than air, such as nitrogen. The gas may be an inert gas. In some examples the gas does not comprise oxygen. Removing first build material from the container may comprise aspiring the first build material. The first build material may comprise part of a total amount of build material contained in the reservoir. The first build material may comprise 50% or less of a total amount of build material contained in the reservoir. The first build material may not comprise build material adhered to a wall of the reservoir. The first build material may not comprise build material comprised in a structure of build material.

In block 1403, the reservoir is collapsed. Collapsing the reservoir may comprise collapsing one or several non-reinforced portions of the reservoir. Collapsing the reservoir may comprise the reservoir adopting a partially collapsed form. The partially collapsed form may have any of the features described above in relation to the containers 1, 41, 51 and 61. In some examples, collapsing the reservoir comprises creating a pressure differential between the inside of the reservoir and the outside of the reservoir, for example, such that a pressure within the reservoir is lower than a pressure outside the reservoir. Collapsing the reservoir may occur responsive to a pressure differential between the inside of the reservoir and the outside of the reservoir reaching a threshold value. Collapsing the reservoir may result in dislodging build material adhered to a wall of the reservoir. Collapsing the reservoir may result in breaking up one or several structures of build material.

In block 1404, second build material is removed from the container. Removing second build material from the container may be performed in the same manner as removing first build material from the container. The second build material may comprise part of a total amount of build material contained in the reservoir. The second build material may comprise all or substantially all of the build material remaining in the reservoir following removal of the first build material. The second build material may comprise part of the build material remaining in the reservoir following removal of the first build material. The second build material may comprise build material dislodged from a wall of the reservoir. The second build material may comprise build material previously (i.e. before collapse of the reservoir) comprised in a structure of build material.

In some examples, following the performance of block 1203 the container may be disposed of, in block 1204. Disposing of the container may be performed responsive to a detection (for example, by a human operator or by an automated system of the 3D printing apparatus and/or the container) that the container is empty or substantially empty, and/or that the container contains less than a threshold amount of build material. Disposing of the container may be performed responsive to a determination (for example, by a human operator and/or an automated system of the 3D printing apparatus and/or the container) that the container has already been refilled a threshold number of times, and/or that the container is damaged. Following performance of block 1204 the process may be repeated.

In some examples, following the performance of block 1203 the container may be refilled, in block 1205. Refilling of the container may be performed responsive to a detection (for example, by a human operator and/or an automated system of the 3D printing apparatus and/or the container) that the container is empty or substantially empty, and/or that the container contains less than a threshold amount of build material. Refilling of the container may be performed responsive to a determination (for example, by a human operator and/or an automated system of the 3D printing apparatus and/or the container) that the container has already been refilled less than a threshold number of times, and/or that the container is undamaged. The container may be refilled with virgin build material. Alternatively, the container may be refilled with used build material. Following performance of block 1204 the process may be repeated from block 1202, for example, if the container has not been taken away for refilling but has been refilled in the same position in which it is connectable to the build material removal system. Alternatively, for example, if the container has been taken away for refilling, the process may be repeated from block 1201.

Although the flow diagrams in FIGS. 13 and 14 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are contemplated.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Claims reciting "a" or "an" with respect to a particular element contemplate incorporation of at least one such element, neither requiring nor excluding two or more such elements. Further, the terms "include" and "comprise" are used as open-ended transitions.

What is claimed is:

1. A 3D printing build material container comprising:
a reservoir to hold build material; and
a reinforcement structure attached to the reservoir at at least one selected location;
the reservoir being flexible and the reinforcement structure comprising fold lines to transition the container between a flat configuration and an in-use configuration in which the reservoir is fillable with build material;
the reinforcement structure having an upper portion and a lower portion, the lower portion comprising flaps with additional fold lines, the flaps forming a pyramidal shape in the in-use configuration, the lower portion further comprising rigid panels extending straight from the upper portion along a length of the pyramidal shape in the in-use configuration;
wherein a first panel of the upper portion has, at a bottom end, some of the flaps to form the pyramidal shape and a second panel of the upper portion has, at a bottom end, one of the rigid panels extending along the pyramidal shape in the in-use configuration, a diagonal slit extending from a line between the first and second panels outward for separating the flaps on the first panel forming the pyramidal shape from the rigid panel on the second panel.

2. The container of claim 1, wherein the volume occupied by the container in the in-use configuration is at least 80% greater than the volume occupied by the container in the flat configuration.

3. The container of claim 1, wherein the reinforcement structure comprises a single piece of material.

4. The container of claim 1, wherein when the container is the in-use configuration the reservoir, at least when in a filled and not collapsed state, comprises a non-converging upper section and a converging lower section.

5. The container of claim 1, wherein the at least one selected location is comprised in the upper portion.

6. The container of claim 1, wherein the reservoir is glued to the reinforcement structure.

7. The container of claim 1, further comprising a build material outlet structure to allow build material to exit the reservoir, and a gas inlet structure to allow a gas to enter the reservoir, the build material outlet structure and gas inlet structure being located together in a top portion of the reservoir when in the in-use configuration.

8. The container of claim 1, wherein the flaps of the reinforcement structure comprise holes to receive a fastener securing the flaps in the pyramidal shape.

9. The container of claim 1, wherein the reinforcement structure comprises a pair of sections which, when the container is in the in-use configuration, form opposing side walls of a cuboidal structure, each section of the pair of sections being folded on itself when the container is in the flat configuration.

10. The container of claim 1, further comprising a support structure to retain the container in the in-use configuration, wherein the support structure is spatially separable from the reinforcement structure and the reservoir when the container is in the flat configuration, and is connected to the reinforcement structure when the container is in the in-use configuration.

11. The container of claim 10, wherein the support structure is foldable.

12. The container of claim 1, wherein the reservoir is formed from a plastics material and the reinforcement structure is formed from cardboard.

13. A 3D printing build material container comprising:
an inner part, formed from a relatively flexible material, for receiving and retaining build material; and
an outer part, formed from a relatively rigid material, disposed around the inner part and having fold lines between adjacent panels such that the container is reconfigurable between a first flat configuration in which the outer part is flat and unassembled, and a second in-use configuration in which the outer part is folded at the fold lines so that the adjacent panels form an enclosure for the inner part;
wherein the inner part is attached to the outer part in the flat configuration;
wherein the outer part has an upper portion and a lower portion, the lower portion comprising flaps with additional fold lines, the flaps forming a pyramidal shape in the in-use configuration, the lower portion further comprising rigid panels extending straight from the upper portion along a length of the pyramidal shape in the in-use configuration; and
wherein a first panel of the upper portion has, at a bottom end, some of the flaps to form the pyramidal shape and a second panel of the upper portion has, at a bottom end, one of the rigid panels extending along the pyramidal shape in the in-use configuration, the rigid panels extending without a fold from the second panel in the in-use configuration.

14. The container of claim 13, wherein the inner part is glued to the outer part.

15. A container of build material of an additive manufacturing system, the container comprising:
a flexible bag to hold the build material, the flexible bag having an inlet structure and a separate outlet structure;
a rigid reinforcement structure to enclose and support the flexible bag, the rigid reinforcement structure having fold lines between adjacent panels such that the rigid reinforcement structure has a flat configuration in which the rigid reinforcement structure is flat and unassembled and an in-use configuration in which the rigid reinforcement structure is folded at the fold lines so that adjacent panels form an enclosure for the flexible bag;
wherein the flexible bag is attached to the rigid reinforcement structure in both the flat and in-use configurations;
wherein the reinforcement structure has an upper portion and a lower portion, the lower portion comprising flaps with additional fold lines, the flaps forming a pyramidal shape in the in-use configuration, the lower portion further comprising rigid panels extending straight from the upper portion along a length of the pyramidal shape in the in-use configuration; and
wherein a first panel of the upper portion has, at a bottom end, some of the flaps to form the pyramidal shape and a second panel of the upper portion has, at a bottom end, one of the rigid panels extending along the pyramidal shape in the in-use configuration, the rigid panel connected to and extending only from the second panel.

16. The container of claim 7, wherein a number of the flaps comprise a fastener structure to secure the flaps in the pyramidal configuration.

17. The container of claim 15, wherein a panel of the rigid reinforcement structure comprises a window providing a view of a bottom portion of the flexible bag in the in-use configuration.

18. The container of claim 17, wherein two panels of the rigid reinforcement structure that are opposite each other in the in-use configuration each comprise a window providing a view of a bottom portion of the flexible bag in the in-use configuration.

19. The container of claim 15, wherein two panels of the rigid reinforcement structure that are opposite each other in the in-use configuration each comprise a central fold line and are folded on themselves in the flat configuration.

\* \* \* \* \*